(12) United States Patent
Crottie

(10) Patent No.: US 7,661,306 B2
(45) Date of Patent: Feb. 16, 2010

(54) INSTRUMENTS FOR FLOW METERS

(75) Inventor: Edward Thompson Crottie, Houston, TX (US)

(73) Assignee: Dresser, Inc., Addison, TX (US)

( * ) Notice: Subject to any disclaimer, the term of this patent is extended or adjusted under 35 U.S.C. 154(b) by 7 days.

(21) Appl. No.: 11/671,846

(22) Filed: Feb. 6, 2007

(65) Prior Publication Data
US 2008/0184791 A1 Aug. 7, 2008

(51) Int. Cl.
*G01F 15/07* (2006.01)
*G01F 15/02* (2006.01)

(52) U.S. Cl. .......................... 73/275; 73/261
(58) Field of Classification Search ................ 73/866.5, 73/275, 261
See application file for complete search history.

(56) References Cited

U.S. PATENT DOCUMENTS

| | | | | |
|---|---|---|---|---|
| 2,281,670 | A | * | 5/1942 | Brown .......................... 73/268 |
| 4,080,827 | A | * | 3/1978 | Esola .......................... 73/275 |
| 4,489,600 | A | | 12/1984 | Han |
| 5,305,647 | A | * | 4/1994 | Atkinson .................. 73/861.01 |
| 5,530,298 | A | | 6/1996 | Gerhold |
| 5,637,805 | A | | 6/1997 | Adams et al. |
| 5,970,791 | A | | 10/1999 | Barczynski et al. |
| 6,012,339 | A | | 1/2000 | Genack et al. |

FOREIGN PATENT DOCUMENTS

| | | |
|---|---|---|
| EP | 0 017 874 A1 | 10/1980 |
| GB | 10062 A.D. 1909 | 4/1908 |
| GB | 757594 | 9/1956 |
| WO | WO2002/088642 | 11/2002 |

OTHER PUBLICATIONS

Dresser, "Roots Meters & Instruments—Roots® Micro Corrector—MC2", Dresser, 2004, 2005, 4 pages.
Dresser, "Tech Specs—Roots® Solid State Pulser", Dresser, 2004, 2 pages.
Dresser, "Roots Meters Instruments—Products and Services", 2004, 28 pages.
Notification of Transmittal of the International Search Report and the Written Opinion of the International Searching Authority, or the Declaration (2 pages), International Search Report (3 pages), and Written Opinion of the International Searching Authority (7 pages) for International Application No. PCT/US2007/063601, dated Oct. 18, 2007.
International Preliminary Report on Patentability by the International Preliminary Examining Authority, for International Application No. PCT/US2007/063601, mailed Jul. 30, 2009 (14 pages).

* cited by examiner

*Primary Examiner*—Lisa M Caputo
*Assistant Examiner*—Punam Patel
(74) *Attorney, Agent, or Firm*—Fish & Richardson P.C.

(57) ABSTRACT

Some embodiments of an instrument for a flow meter can automatically adjust in response to the rotational direction of the drive shaft of the flow meter, thereby permitting the instrument device to perform its intended function regardless of the fluid flow direction through the flow meter. In one example, the instrument may comprise a corrector instrument that includes a counter.

36 Claims, 12 Drawing Sheets

INSTRUMENTS FOR FLOW METERS

TECHNICAL FIELD

This document relates to meter devices, such as a flow meter used to indicate fluid flow through a conduit.

BACKGROUND

Meter devices can be used to measure the amount of fluid flow through a conduit, such as residential, commercial or industrial gas loads that are delivered through a system of gas lines. For example, some meter devices are used in natural gas flow systems to measure the amount of natural gas transmitted from a producer, transmitted from a distributor, or transmitted to a user. Such meter measurements can be tabulated for purposes of billing consumers of the natural gas.

In some circumstances, one or more instruments can be mounted to a meter device to display, store, or transmit information related to the meter device. For example, some gas meters may include remote reader instruments that can transmit data regarding the gas flow (measured values or corrected values) to a service provider. Such remote reader instruments may tabulate the accumulation of electrical pulses produced by the instrument and then correlate the electrical pulses to a volume of fluid that passes through the meter device.

Some instruments that are mounted to a meter device are driven by energy generated from the fluid flow through the meter device. For example, a rotary positive displacement gas meter may employ impellers that rotate in response to gas being directed from a conduit to the meter to act upon the impellers. The rotation of the impellers can be translated to rotation of a drive shaft, which is used to drive the instruments. If, however, the meter is connected to the conduit so that fluid flows through the meter in an opposite direction, the rotation of the impellers (and the rotation of the drive shaft) may be reversed. Because the instruments mounted to the flow meter are driven by the drive shaft, the reverse rotation of the drive shaft may affect the operation of the instruments. For example, a typical corrector instrument that includes a counter may count upward when the fluid flows through the meter in a particular direction, but may count in reverse if the meter is connected to the conduit so that fluid flows therethrough in the opposite direction.

To account for the flow direction through the meter and the resulting rotational direction of the drive shaft, a field technician may be required to partially disassemble the instrument and manually adjust one or more gears inside the instrument's drive train before installing the instrument to the meter device. Such a manual adjustment of the gears inside the instrument can be time consuming and complex, especially when the instrument is being installed in harsh ambient conditions (e.g., cold outdoor conditions, hot ambient temperatures near a burner, or the like).

Alternatively, a technician may remove the meter itself from its conduit, physically turn the meter around, and then reinstall the meter to thereby reverse the input and output ends to reverse the rotation of the drive shaft. Or, a technician may reconfigure the conduit to reverse the follow through the meter and thereby reverse the rotation of the drive shaft. Such manual reconfigurations of the conduit or the meter can be time consuming and complex and may even require pressure testing of connections.

SUMMARY

Some embodiments an improved instrument for a flow meter can automatically adjust in response to the rotational direction of an input shaft, thereby permitting the instrument device to perform its intended function regardless of the fluid flow direction through the flow meter. In these circumstances, the instrument can be installed to the flow meter without the need to partially disassemble the instrument and manually adjust one or more gears inside the instrument's drive train. In one example, the instrument may comprise a corrector instrument that includes a counter device. The corrector instrument may have self-adjusting gear system that automatically shifts in response to the rotational direction of a drive shaft, and thus the counter device can count in positive increments regardless of the fluid flow direction through the flow meter.

In particular embodiments, an instrument for a flow meter may include an input shaft that is driven to rotate in a first direction or in a second opposite direction by a flow meter when the input shaft is coupled to the flow meter. The instrument may also include an output shaft that rotates in response to rotation of the input shaft, the rotation of the output shaft causing a data device to collect information related to the flow meter. The instrument may further include a gear system that couples the input shaft to the output shaft. The gear system may automatically adjust and thereby direct the output shaft in a forward rotational direction in response to both rotation of the input shaft in the first direction and rotation of the input shaft in the second opposite direction.

Some embodiments include a method for mounting an instrument to a flow meter. The method may include identifying a flow meter installed in a fluid flow system such that fluid passes through the flow meter in a first flow direction or a second opposite flow direction. The method may also include mounting an instrument to the flow meter without manually adjusting an internal gear of the instrument to account for the flow direction through the flow meter. The instrument may include a counter device that provides information related to the fluid flow through the flow meter. The instrument can automatically adjust so that the counter device counts in positive increments independent of whether fluid passes through the flow meter in the first flow direction or in the second opposite flow direction.

In some embodiments, a corrector instrument for a flow meter may include an input shaft that is driven to rotate in a first direction or in a second opposite direction by an instrument drive device of a flow meter when the input shaft is coupled to the instrument drive device. The corrector instrument may also include an output shaft that rotates in response to rotation of the input shaft. The rotation of the output shaft may cause a magnet coupled to the output shaft to rotate. The instrument may further include an electronic data device arranged proximate to the magnet to detect the rotation of the magnet and generate information related to an amount of fluid flow through the flow meter. The instrument may also include a gear system that couples the input shaft to the output shaft. The gear system may automatically adjust and thereby direct the output shaft in a forward rotational direction in response to both rotation of the input shaft in the first direction and rotation of the input shaft in the second opposite direction.

In certain embodiments, an instrument drive device for a flow meter may include an input shaft that is driven to rotate in a first direction or in a second opposite direction by a flow meter when the input shaft is coupled to the flow meter. The instrument drive device may also include a drive shaft that rotates in response to rotation of the input shaft. The drive shaft may be arranged to drive an instrument when the instrument is coupled to the drive shaft. The instrument drive device may further include a gear system that couples the input shaft to the output shaft. The gear system may automatically adjust and thereby direct the drive shaft in a forward rotational direction in response to both rotation of the input shaft in the first direction and rotation of the input shaft in the second opposite direction.

In some embodiments, an index instrument for a flow meter may include a mechanical counter device that provides information related to the fluid flow through a flow meter. The index instrument may also include an input shaft that is driven to rotate in a first direction or in a second opposite direction by a flow meter when the input shaft is coupled to the flow meter. The index instrument may also include an output shaft that rotates in response to rotation of the input shaft. The rotation of the output shaft can cause a mechanical counter device to operate. The index instrument may further include a gear system that couples the input shaft to the output shaft. The gear system can automatically adjust so that the mechanical counter device counts in positive increments in response to both rotation of the input shaft in the first direction and rotation of the input shaft in the second opposite direction.

These and other embodiments may provide one or more of the following advantages. First, an instrument for a flow meter can include a self-adjusting gear system that automatically shifts position in response to the input shaft rotating in one of the first direction and the second, opposite direction. In such circumstances, the instrument can automatically adjust and readily provide a proper output regardless of the fluid flow direction through the flow meter. Second, if the instrument is the type that is installed while the flow meter is in the field of operation, the instrument can be installed by a field technician without the need to partially disassemble the instrument and manually adjust internal gears. As such, the field technician is not required to consider the positive direction of the fluid flow (or the flow meter's drive shaft) and thereafter manually adjust the instrument's internal gears in accordance with the positive direction. Instead, the field technician can readily mount the instrument to the flow meter, and the instrument will automatically adjust to account for the positive direction of the fluid flow. Third, the instrument can include a counter device that counts in positive increments independent of whether fluid passes through the flow meter in a first flow direction or in a second opposite flow direction. Accordingly, the counter device does not necessarily count in reverse if the instrument is connected to the flow meter without accounting for the positive flow direction therethrough.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1A:
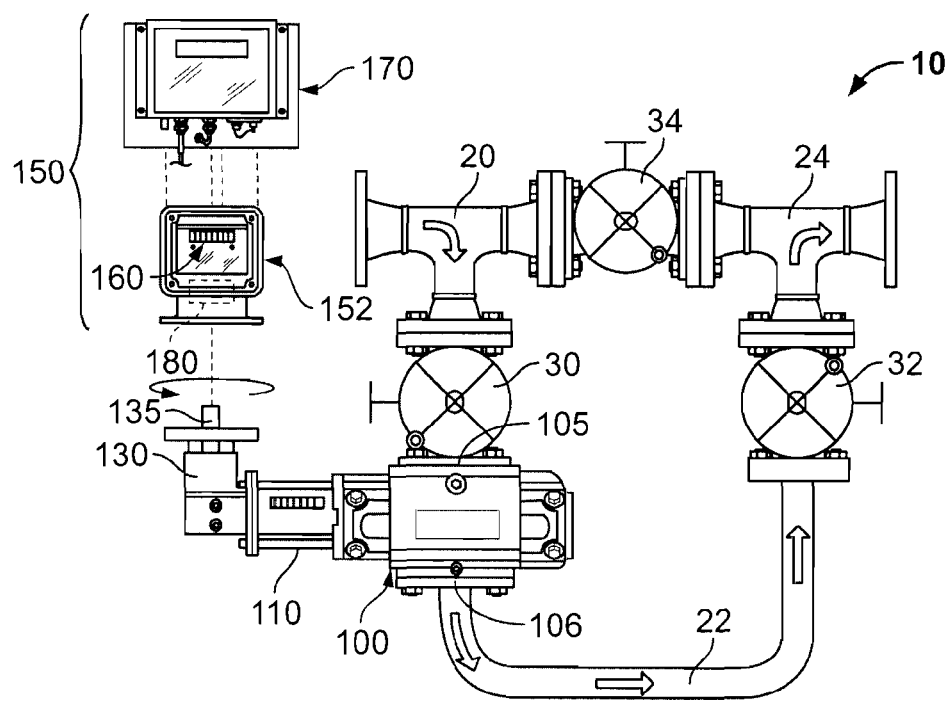
FIGS. 1A-B are views of a flow meter in a fluid flow system, in accordance with some embodiments.
Figure 1B:
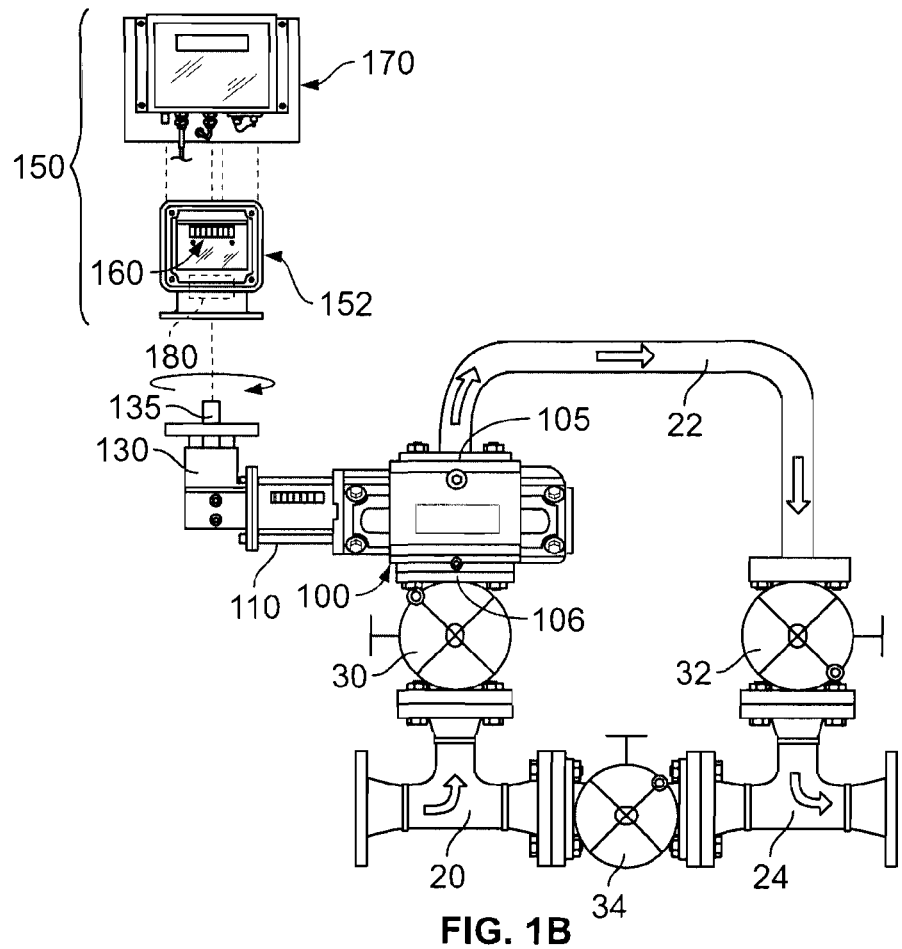

Referring to FIGS. 1A-B, a fluid flow system 10 may include one or more conduits 20, 22, and 24 that direct fluid through a flow meter 100. The fluid can include a gas, a liquid, or a particulate slurry, or any combination thereof. The fluid flow system 10 can include control valves 30 and 32 that are opened to permit the fluid flow through the flow meter 100. Optionally, the flow system 10 may include a bypass valve 34 that can be opened to permit the fluid to bypass the flow meter 100 and conduit 22. The flow meter 100 may be incorporated into the fluid flow system 10 to provide information related to the fluid flow in the system 10 (e.g., to measure a volume of the fluid passing through the flow meter 100). For example, the flow meter 100 can be used in a natural gas flow system to measure the amount of natural gas transmitted through the conduit 22 and to a user. Such measurements by the flow meter 100 can be collected for purposes of billing the user of the natural gas.

One or more instruments can be coupled to the flow meter 100 to provide information related to the fluid flow through the flow meter 100. Examples of such instruments include an index instrument 110, an instrument drive device 130, and a corrector instrument 150. Each of these instruments can be operated by the energy generated from the fluid that flows through the flow meter 100. For example, the flow meter 100 may comprise a rotary positive displacement gas meter that includes impellers (not shown in FIGS. 1A-B) to rotate when the fluid passes through the flow meter 100 and act upon the impellers. The rotation of the impellers can be translated to rotation of a shaft, which is used to drive the one or more instruments coupled to the flow meter 100. For example, the index instrument 110 may be assembled to the flow meter 100 so that a mechanical counter device indicates the amount of fluid flow through the flow meter 100 (refer also to FIG. 2). The index instrument 110 may include a gear assembly that causes the mechanical counter device to incrementally adjust in response to rotation of the impellers inside the flow meter 100. In another example, the instrument drive device 130 can be mounted to the flow meter 100 (either directly or indirectly via the index instrument 110) to translate rotational motion from the impellers to a drive shaft 135, which can be used to operate a number of accessory instruments such as the corrector instrument 150 (described in more detail below).

Still referring to FIGS. 1A-B, at least one of the instruments 110, 130, and 150 includes an improved feature in which the instrument can be self-adjusting so that the instrument performs its output function independent of whether fluid passes through the flow meter 100 in a first flow direction (FIG. 1A) or in the second, opposite flow direction (FIG. 1B). In this embodiment, the instrument 150 mounted to the instrument drive 130 is configured to provide such an automatic adjustment. For example, the instrument 150 can include a self-adjusting gear system 180 (described in more detail below in connection with FIGS. 10A-B) that automatically shifts position to provide a positive output independent of whether the drive shaft 135 rotates in a first direction (FIG. 1A) or a second, opposite direction (FIG. 1B). In this embodiment, the instrument 150 is a corrector instrument that includes a mechanical counter device 160 and an electronic counter device 170. Because the corrector instrument 150 includes the self-adjusting gear system 180, the corrector instrument 150 is capable of performing its output function by counting upward in positive increments regardless of the positive rotational direction of the drive shaft 135 on the instrument drive device 130 (e.g., independent of whether the drive shaft 135 rotates in a first direction (FIG. 11A) or a second, opposite direction (FIG. 1B)).

Thus, if the corrector instrument 150 is to be installed while the flow meter 100 is in the field of operation (e.g., already mounted into the flow system 10), the instrument 150 can be readily installed to the flow meter 100 without the need to partially disassemble the instrument and manually adjust internal gears. For example, the field technician is not required to consider the positive direction of the fluid flow and thereafter manually adjust the instrument's internal gears in accordance with the positive rotational direction of the drive shaft 135. Rather, as described below, the field technician can readily mount the instrument 150 to the instrument drive 130, and the instrument 150 will self-adjust its internal gear system 180 to account for the positive direction of the fluid flow (and the positive rotational direction of the drive shaft 135). FIGS. 1A-B illustrate an example of this functionality.

As shown in FIG. 1A, the flow system 10 may be configured so that the fluid passes through the flow meter 100 in a first direction and then through the conduit 22. For example, the fluid enters the flow meter 100 through a first port 105 and then exits the flow meter 100 through a second port 106. Accordingly, when the flow meter 100 is mounted into the flow system 10 in this orientation, the fluid acts upon the impellers (not shown in FIG. 1A) of the flow meter 100 to drive the rotation of the impellers. This rotational motion of the impellers can be translated to the index instrument 110 and the instrument drive device 130 via a number of shafts and gears. Thus, the positive flow through the flow meter 100 in the first direction (FIG. 1A) causes the drive shaft 135 of the instrument drive device 130 to have a positive rotation in a first direction. The corrector instrument 150 can be mounted to the instrument drive device 130 so that the drive shaft 135 is coupled to the self-adjusting gear system 180 of the instrument 150. As described in more detail below, the corrector instrument 150 is capable of performing its output function by counting upward in positive increments independent of the positive rotational direction of the drive shaft 135 on the instrument drive device 130. Thus, the corrector instrument 150 can be mounted to the instrument drive device 130 without the need to partially disassemble the instrument 150 and manually adjust internal gears.

As shown in FIG. 1B, the flow system 10 alternatively may be configured so that the fluid passes through the flow meter 100 in a second direction and then through the conduit 22. For example, in this alternative configuration, fluid enters the flow meter 100 through the second port 106 and exits the flow meter 100 through the first port 105. When the flow meter is mounted into the flow system 10 in this orientation, the fluid acts upon the impellers (not shown in FIG. 1B) of the flow meter 100 to drive the impellers in a direction opposite that described in connection with FIG. 1A. Again, this rotational motion of the impellers can be translated to the index instrument 110 and the instrument drive device 130 via a number of shafts and gears. Thus, the positive flow through the flow meter 100 in the second direction (FIG. 1B) causes the drive shaft 135 of the instrument drive device 130 to have a positive rotation in a second direction. Even though the positive rotational direction of the drive shaft 135 is in the second direction opposite the first direction shown in FIG. 1A, the corrector instrument 150 can nevertheless be mounted to the instrument drive device 130 without the need to partially disassemble the instrument 150 and manually adjust internal gears. Due to the operation of the gear system 180 (described below, for example, in connection with FIGS. 10A-B), the corrector instrument 150 is capable of automatically adjusting to count upward in positive increments regardless of the positive rotational direction of the drive shaft 135 on the instrument drive device 130.

It should be understood from the description herein that, in other embodiments, the self-adjusting gear system 180 may be implemented in other instruments for the flow meter 100. For example, as described in more detail below in connection with FIGS. 11A-B and 12-13, the self-adjusting gear system 180 may be arranged in the index instrument 110 so that the index instrument counts in positive increments regardless of whether the fluid flow through the meter 100 is in the first direction (FIG. 11A) or the second direction (FIG. 11B). In another example, as described in more detail below in connection with FIGS. 14A-B, the self-adjusting gear system 180 may be arranged in the instrument drive device 130 so that the drive shaft 135 rotates in one direction independent of whether the positive fluid flow through the meter is in the first direction (FIG. 14A) or the second direction (FIG. 14B).

Figure 2:
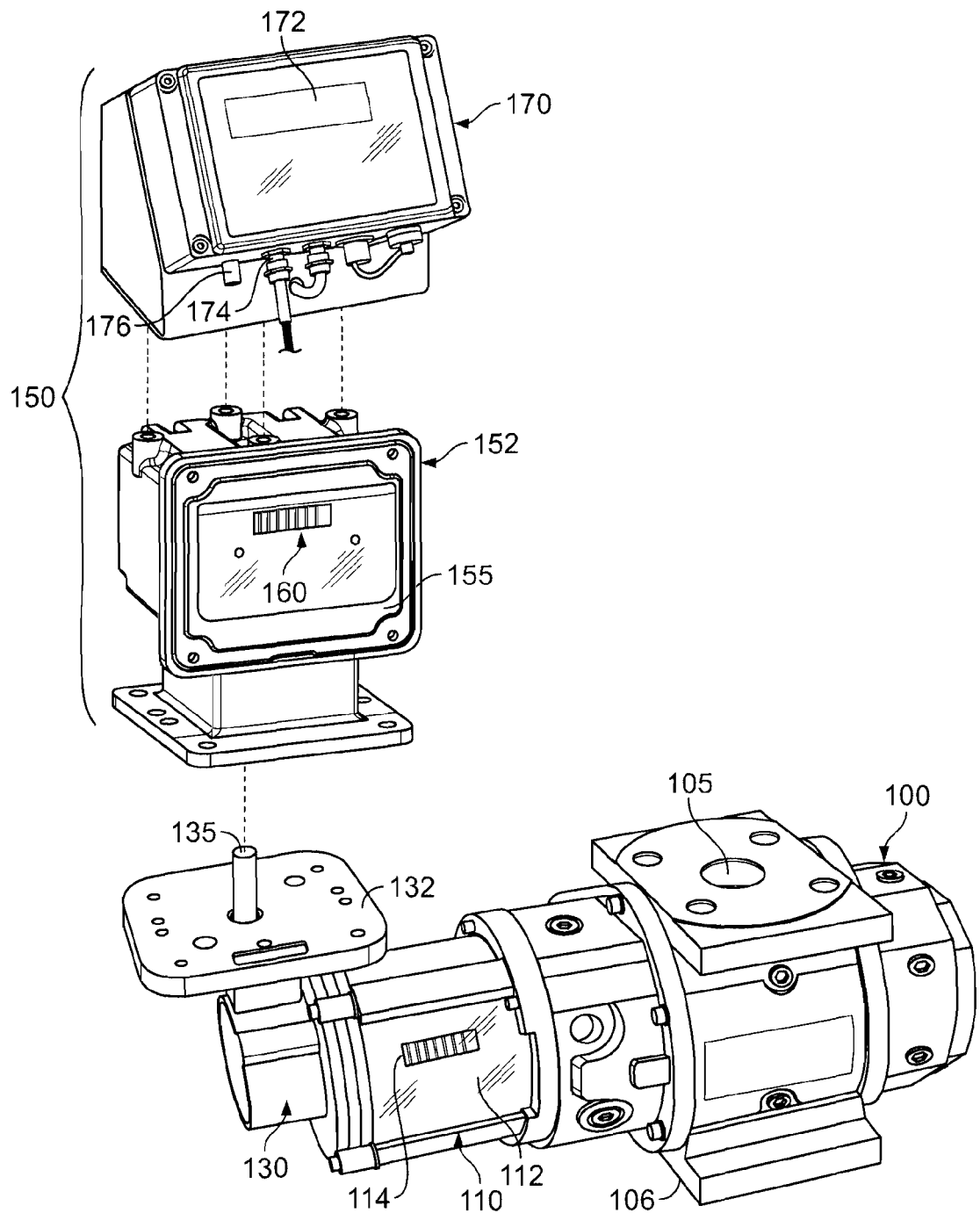
FIG. 2 is a perspective exploded view of an instrument and the flow meter shown in FIGS. 1A-B.

Referring now to FIG. 2, the index instrument 110, the instrument drive device 130, and the corrector instrument 150 can be mounted to the flow meter 100 so that the rotation of the flow meter's impellers (not shown in FIG. 2) drives the operation of these instruments. In this embodiment, the index instrument 110 is directly mounted to the flow meter 100 using a number of bolts. When the fluid flows into one of the ports 105 or 106 of the flow meter, the impellers rotate and cause a mechanical counter device 114 in the index instrument 110 to operate. For example, the mechanical counter device 114 may comprise an indicator (e.g., having an appearance similar to a vehicle odometer) that displays information related to the fluid flow through the flow meter 100, such as a volume of fluid passing through the flow meter 100. In some circumstances, the information provided by the mechanical counter device 114 of the index instrument device 110 may comprise raw data that is not necessarily corrected for temperature or pressure variations in the fluid flow. The index instrument 110 may include a window panel 112 so that a user located at the flow meter 100 can view the information provided by the index instrument 110.

The instrument drive device 130 can be indirectly mounted to the flow meter 100 via the index instrument 110. Accordingly, when the fluid flows into one of the ports 105 or 106 of the flow meter 100, the rotation of the impellers is translated (via a number of shafts and gears disposed in the index instrument 110 and in the instrument drive device 130) to the drive shaft 135. As such, in this embodiment, the positive direction of fluid flow through the flow meter 100 dictates the positive direction of rotation for the drive shaft (refer, for example, to FIGS. 1A-B). The drive shaft 135 may extend from a mounting platform 132 of the instrument drive device 130 so that an accessory instrument (e.g., a corrector instrument, a chart recorder, or the like) can connect with the mounting platform 132 and engage the drive shaft 135. In this embodiment, the corrector instrument 150 is indirectly mounted to the flow meter 100 via the instrument drive device 130 and engages the drive shaft 135.

Still referring to FIG. 2, the corrector instrument 150 may include a first assembly 152 that is mountable to the instrument drive device 130 and a second assembly 170 that is connected to the first assembly 152. The first assembly 152 can house the self-adjusting gear system 180 (refer to FIGS. 5-7), which couples with the drive shaft 135 when the corrector instrument 150 is mounted to the instrument drive device 130. In addition, the first assembly 152 may house a mechanical counter device 160 that is viewable through a window panel 155 of the first assembly 152. The mechanical counter device 160 may comprise an indicator (e.g., having an appearance similar to a vehicle odometer) that displays information related to the fluid flow through the flow meter 100. For example, the mechanical counter device 160 may comprise an eight-digit indicator displaying a value for a volume of fluid that passes through the flow meter 100. At least a portion of the window panel 155 is transparent so that the indicator is viewable to a user located at the flow meter 100.

The second assembly 170 may be in the form of an electronic counter device that generates electronic data related to the fluid flow through the flow meter 100. For example, the electronic counter device 170 may house a pulser circuit that senses the rotation of a shaft-mounted magnet 189 (FIGS. 5-6) arranged in the first assembly 152. As such, the electronic counter device 170 can correlate the detected magnet rotations with the fluid flow through the flow meter 100. In some circumstances, the electronic counter device 170 can correct these values to account for variations in temperature, pressure, or both. The electronic counter device 170 may include a user interface 172 (e.g., an electronic display device, one or more buttons, one or more dials, or the like) and at least one communication output 174. The communication output 174 can be used, for example, to communicate one or more signals to a remote site via a hardwire connection, a fiber optic cable connection, a wireless communication connection (e.g., RF communication, infrared communication, cellular communication, satellite communication), or the like. As such, the information gathered by the electronic counter device 170 can be communicated to the remote site (e.g., a central service station) for the purpose of periodically monitoring the fluid flow through the flow meter 100. In this example, the data signals from the electronic counter device 170 can indicate a corrected fluid volume, an uncorrected fluid volume, and an alarm condition. These signals can be communicated to the remote site for purposes of monitoring the fluid flow, billing the consumer of fluid, or a combination thereof.

Still referring to FIG. 2, the corrector instrument 150 may operate when the drive shaft 135 of the instrument drive device 130 rotates, thereby causing the self-adjusting gear system 180 (described, for example, in connection with FIGS. 6-10B) to urge both the mechanical counter device 160 and the electronic counter device 170 to operate. Accordingly, in some circumstances, the accuracy of the information communicated by the electronic counter device 170 can be verified by viewing the mechanical counter device 160 arranged in the corrector instrument 150. As previously described, the mechanical counter device 160 and the electronic counter device 170 of the corrector instrument 150 count upward in positive increments independent of whether the drive shaft 135 rotates in a first direction (FIG. 1A) or a second, opposite direction (FIG. 1B). In some embodiments, the mechanical counter device 160, the electronic counter device 170, or both may indicate corrected values that account for variations in temperature, pressure, or both. If, for example, the mechanical counter device 160 indicates the uncorrected fluid volume, the accuracy of the electronic counter device 170 can be periodically evaluated by comparing the readings of the mechanical counter device 160 to the uncorrected fluid volume data transmitted by the electronic counter device 170.

Figure 3:
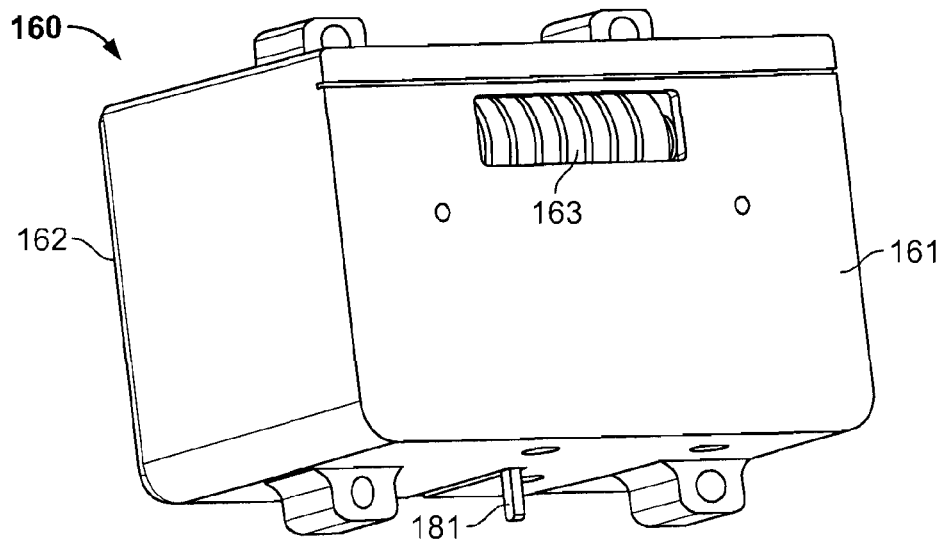
FIG. 3 is a perspective view of a counter device on the instrument of FIG. 2.
Figure 5:
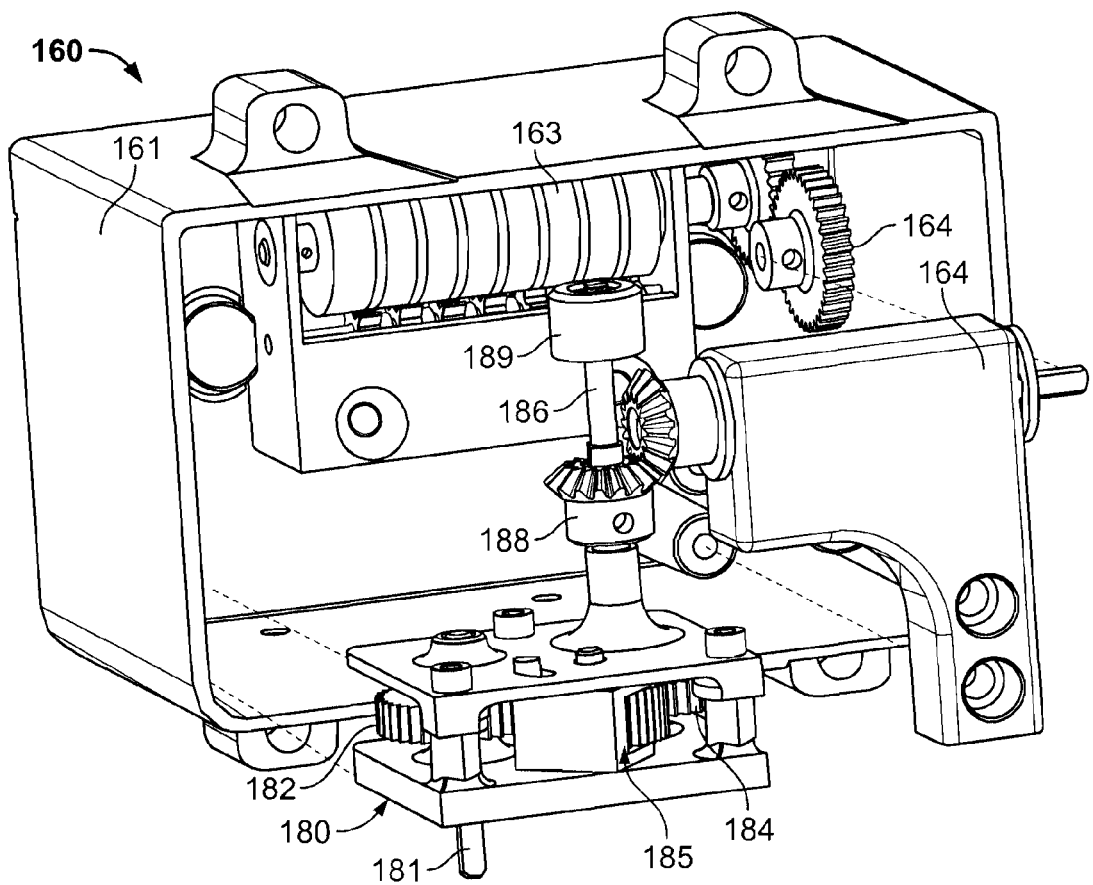
FIG. 5 is another perspective exploded view of the counter device of FIG. 3.
Figure 4:
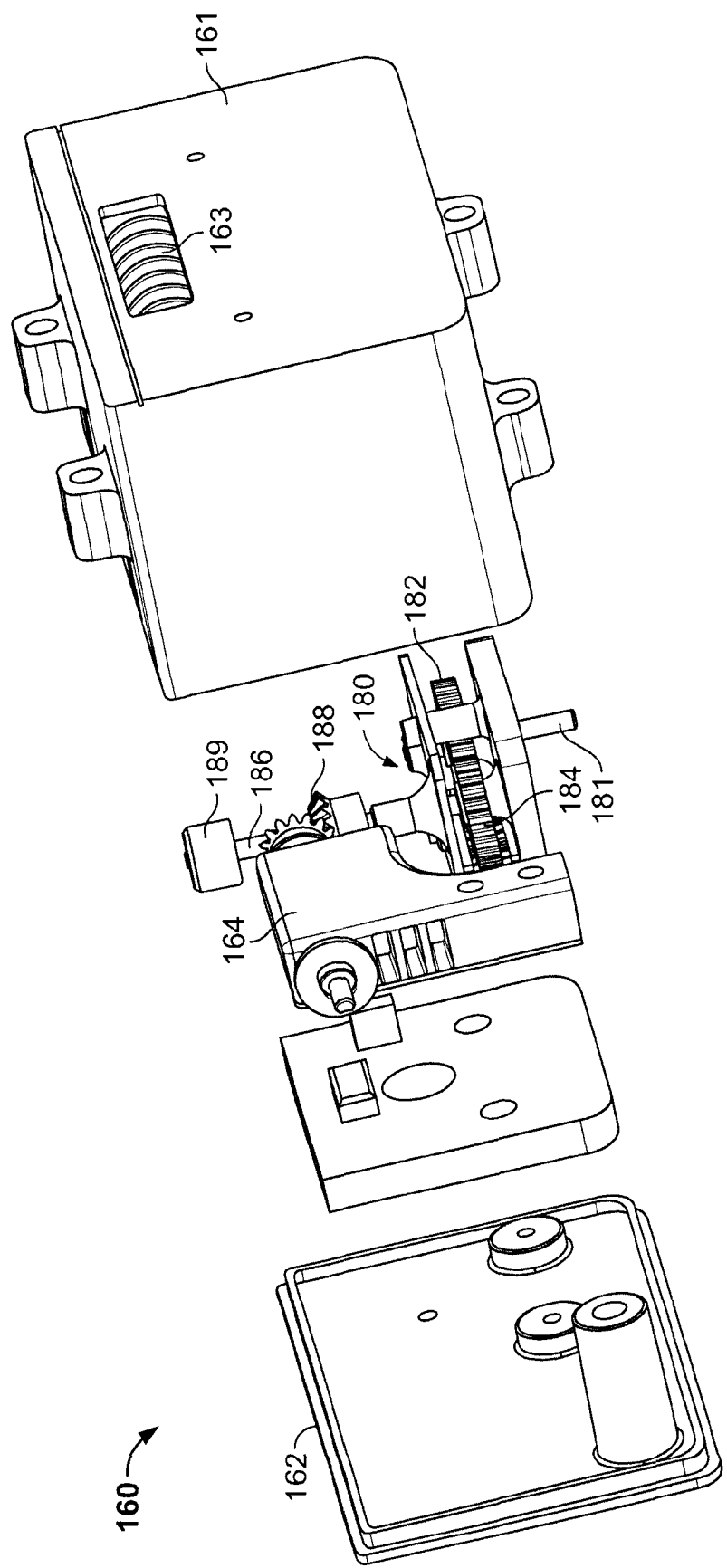
FIG. 4 is a perspective exploded view of the counter device of FIG. 3.

Referring to FIGS. 3-5, the mechanical counter device 160 of the corrector instrument 150 (FIG. 2) may be driven by the self-adjusting gear system 180, which is capable of outputting positive rotation in a forward rotational direction in response to rotation from the drive shaft 135 (FIG. 2). The mechanical counter device 160 has housing components 161 and 162 to contain an indicator mechanism 163 that incrementally adjusts in response to the output rotation of the gear system 180. For example, the indicator mechanism 163 may comprise an eight-digit indicator (e.g., having an appearance similar to a vehicle odometer) that is used to indicate a volume of fluid that passes through the flow meter 100 (FIG. 2). Because the self-adjusting gear system 180 does not output rotation in a reverse direction (opposite the forward direction), the indicator mechanism 163 is not urged to count downward in negative increments.

In some embodiments, the gear system 180 includes an input shaft 181 that engages the drive shaft 135 (FIG. 2) of the instrument drive device 130 such that the input shaft 181 rotates in response to rotation of the drive shaft 135. For example, the input shaft 181 may indirectly engage the drive shaft 135 via a drive dog connection (not shown in FIGS. 3-5). The input shaft 181 is coupled to an input gear 182 (FIG. 5), which drives an output gear 184 via an idler gear assembly 185 (FIG. 5). As described in more detail below in connection with FIGS. 6-10B, the idler gear assembly 185 is capable of automatically adjusting positions so that the output gear 184 rotates in the forward rotational direction independent of the rotational direction of the input gear 182. Accordingly, an output shaft 186 that is coupled to the output gear 184 also rotates in the forward rotational direction both when the input shaft 181 rotates in a first direction and when the input shaft 181 rotates in a second opposite direction.

Still referring to FIGS. 3-5, a bevel gear 188 and a magnet 189 are arranged on the output shaft 186 of the gear system 180. The bevel gear 188 is used to drive the rotation of the gear train 164 for the indicator mechanism 163. The gear train 164 may provide a rotational translation between the gear system 180 and the indicator mechanism 163 so that one rotation by the input shaft (or the drive shaft 135 (FIG. 2)) correlates to a particular volume of fluid that is incrementally counted by the indicator mechanism 163. The magnet 189 is rotated by the output shaft, and as previously described, the magnet rotations can be sensed by the electronic counter device 170 (FIG. 2) to indicate a volume of fluid that passes through the flow meter 100. Because the self-adjusting gear system 180 drives the output shaft to always rotate in the forward rotational direction (independent of the rotational direction of the input shaft 181), the bevel gear 188 and the magnet 189 likewise rotate in the forward rotational direction. Such a configuration causes the indicator mechanism 163 and the electronic counter device 170 (FIG. 2) to count upwardly in positive increments independent of whether the drive shaft 135 rotates in a first direction (FIG. 1A) or a second, opposite direction (FIG. 1B). Thus, a field technician is not required to consider the positive direction of the fluid flow through the meter 100 (FIG. 2) and thereafter manually adjust internal components of the instrument 150 (FIG. 2) in accordance with the positive rotational direction of the drive shaft 135. Rather, the field technician can readily mount the instrument 150 to the instrument drive 130 so that the drive shaft 135 couples with the gear system 180, and the gear system 180 will automatically adjust to account for the positive direction of the fluid flow (and the corresponding rotational direction of the drive shaft 135).

Referring again to FIG. 2 and also to FIGS. 3-4, some embodiments of the instrument 150 may have a construction that reduces the likelihood of tampering. For example, some instruments may include a panel that is readily removable to access internal gears for manual adjustment by a field technician. With these instruments, an individual may attempt to remove the panel and tamper with the internal components so that the instrument does not accurately measure the fluid flow through the flow meter 100 (e.g., undercount the fluid flow to cause inaccurately lower bills). In the particular embodiment of the instrument 150 depicted in FIG. 2, such attempts to tamper with the internal components may be hindered because no such access panel is available to the tampering individual. As shown in FIG. 2, the first assembly 152 of the instrument 150 houses the mechanical counter 160, which is accessible only after removing the front window 155. As shown in FIGS. 3-4, the gear system 180 is further protected from tampering because it is contained within the housing components 161 and 162 of the mechanical counter device 160. Thus, in this embodiment, one must disassemble the mechanical counter device from the first assembly 152 (FIG. 2) and then disassemble the housing 161 and 162 of the mechanical counter device 160 in order to access the gear system 180. Because the self-adjusting gear system 180 can automatically adjust to account for the positive flow direction through the flow meter 100, no access panel is required (in this embodiment) for manual adjustment by a field technician. Thus, in this embodiment, no access panel is available for an individual to readily remove and tamper with the internal components of the instrument 150.

Figure 6:
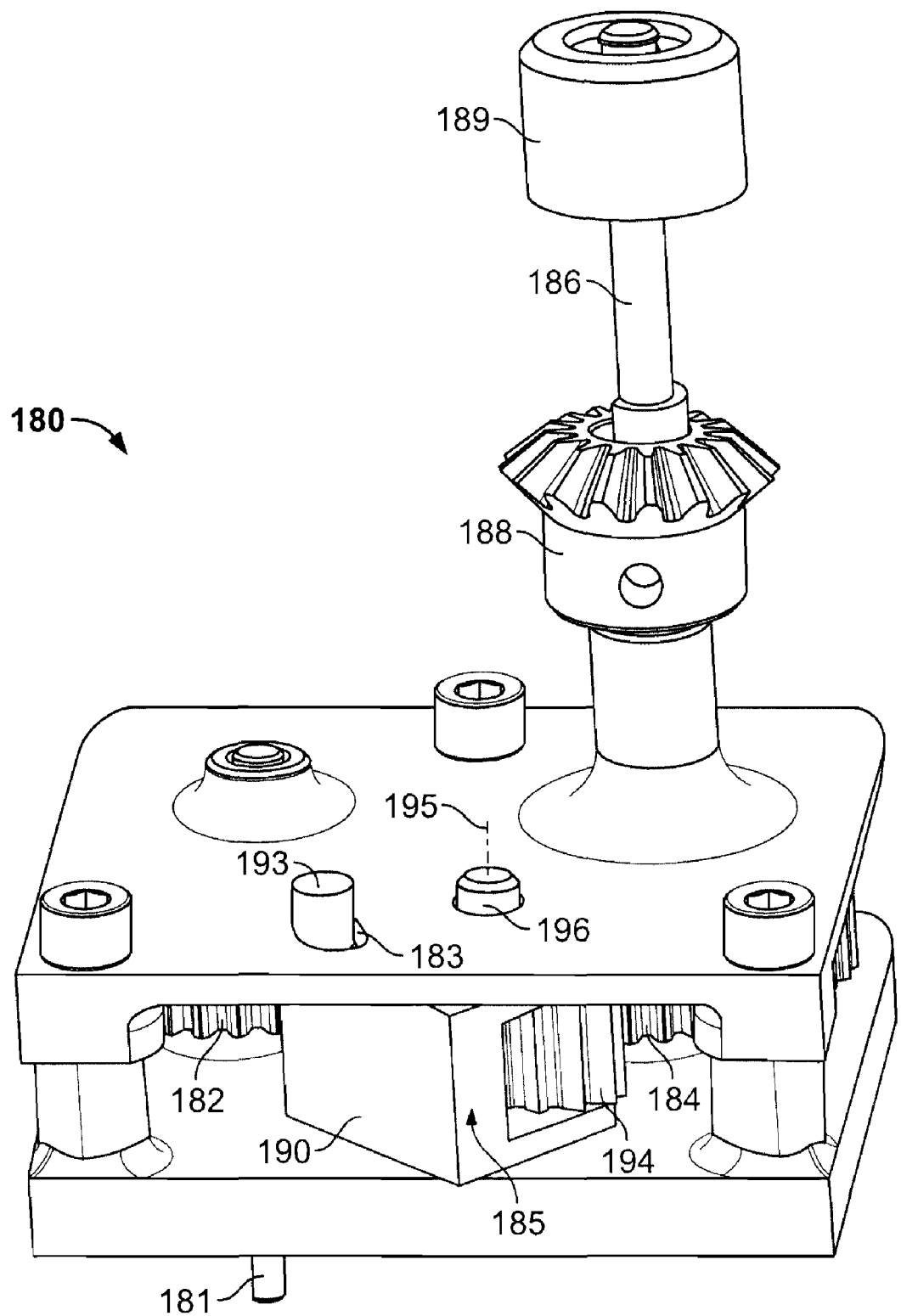
FIG. 6 is a perspective view of a gear system of the instrument of FIG. 2, in accordance with some embodiments.
Figure 7:
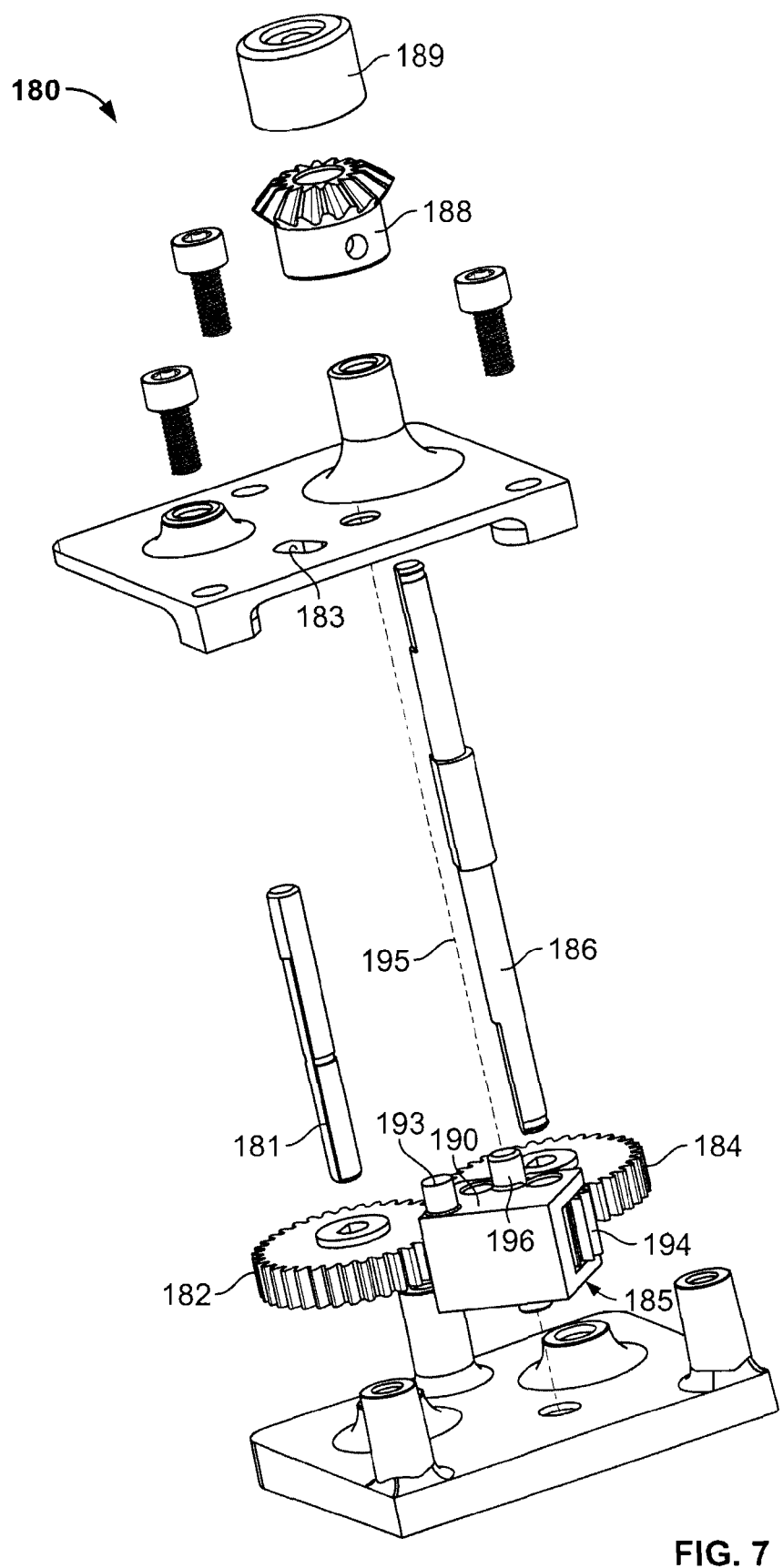
FIG. 7 is a perspective exploded view of the gear system of FIG. 6.

Referring now to FIGS. 6-7, some embodiments of the self-adjusting gear system 180 include an idler gear assembly 185 that can automatically adjust positions in response to the rotational direction of the input shaft 181. In this embodiment, the gear system 180 has a construction such that the gear system 180 as a whole can be readily assembled into (or removed from) the housing components 161 and 162 of the mechanical counter device 160 (FIG. 4). For example, the input gear 182, the output gear 184, and the idler gear assembly 185 may be retained generally in a plane with one another between two mounting plates that are bolted together. The input shaft 181 can be coupled to the input gear 182 so that a portion of the input shaft 181 extends downwardly from the mounting plates toward the drive shaft 135 (FIG. 2) of the instrument drive device 130. Also, the output shaft 186 can be coupled to the output gear 184 so that the output shaft 186 extends upwardly from the mounting plates toward the gear train 164 (FIG. 5) of the mechanical counter device 160. As previously described, the bevel gear 188 and the magnet 189 are received on the output shaft 186 to rotate with the output shaft.

The idler gear assembly 185 may be movable relative to the input gear 182 and the output gear 184. For example, in this embodiment, the idler gear assembly 185 can pivot about an axis 195 relative to the input gear 182 and the output gear 186. The idler gear assembly 185 may include a movable body 190 that retains idler gears 192 and 194 (refer also to FIG. 9). The movable body 190 includes a guide pin 193 that is movable within a guide slot 183 of the gear system mounting plate. Also, the movable body 190 includes a pivot pin 196 that pivots about the axis 195 when the guide pin 193 moves within the guide slot 183. Such a pivoting motion of the idler gear assembly 185 may occur automatically in response to the rotational direction of the input shaft 181 and the input gear 182. Thus, the self-adjusting gear system 180 may not require manual adjustment by a field technician at the time of instrument installation. As described in more detail below, such a pivoting motion of the idler gear assembly 185 can cause at least one of the idler gears (e.g., idler gear 194) to become engaged or disengaged with the output gear 184.

Figure 8:
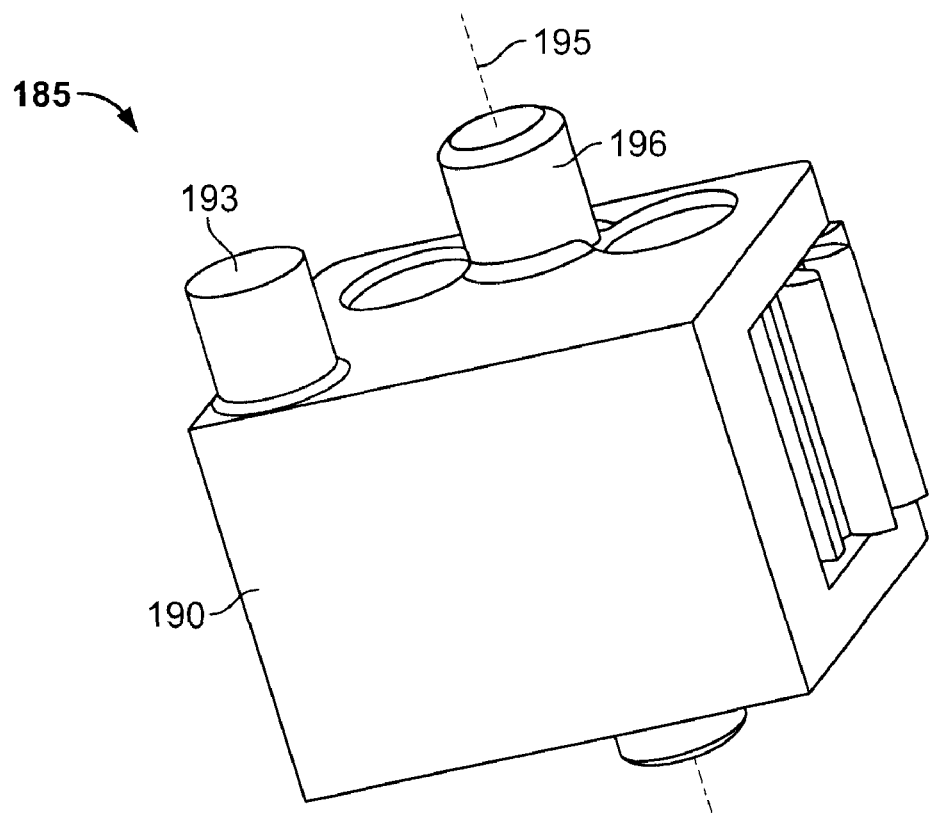
FIG. 8 is a perspective view of a component of the gear system of FIG. 6.
Figure 9:
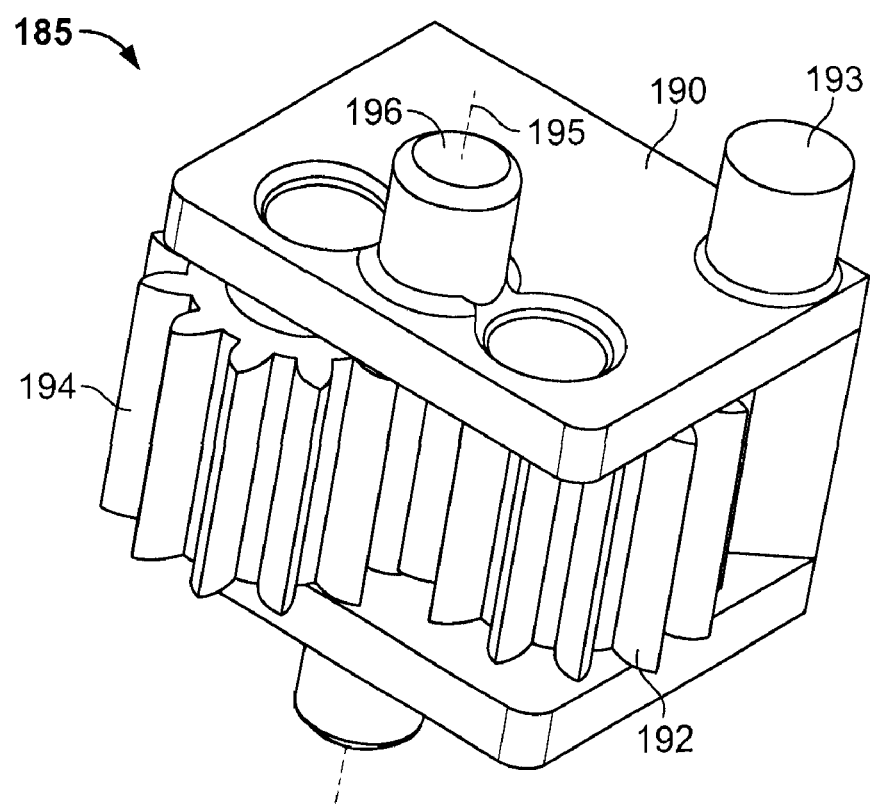
FIG. 9 is another perspective view of the component of the gear system of FIG. 6.

Referring to FIGS. 8-9, in this embodiment, the idler gear assembly 185 retains two or more gears 192 and 194 in a rotational relationship. For example, the idler gear 192 is rotatable about its central longitudinal axis relative to the movable body 190, and the second idler gear 194 is rotatable about its central longitudinal axis relative to the movable body 190. In these circumstances, one or both of the idler gears 192 and 194 can rotate with the input and output gears 182 and 184 (FIGS. 6-7) while the movable body 190 is in a first position (refer to FIG. 10A) or a second position (refer to FIG. 10B). The guide pin 193 and the pivot pin 196 can be integrally formed with the movable body 100, for example, during a polymer molding process. Thereafter, the first and second idler gears 192 and 194 can be assembled with the movable body 190 so that the idler gears 192 and 194 are rotatable relative to the movable body 190. In this embodiment, the pivot pin 196 is arranged between the central axis of the first idler gear 192 and the central axis of the second idler gear 194. As such, the idler gears 192 and 194 adjust positions relative to the input and output gears 182 and 184 (FIGS. 6-7) when the movable body 190 pivots about the pivot axis 195 of the pivot pin 196.

Figure 10A:
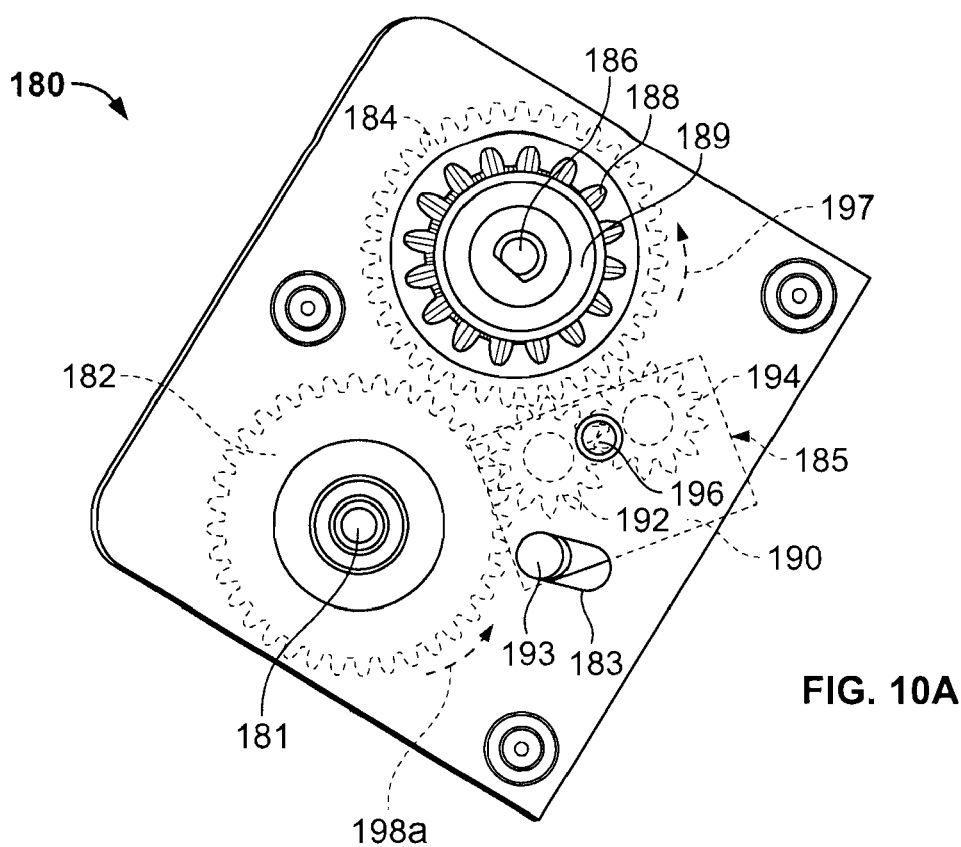
FIG. 10A is a top view of the gear system of FIG. 6 in a first position.
Figure 10B:
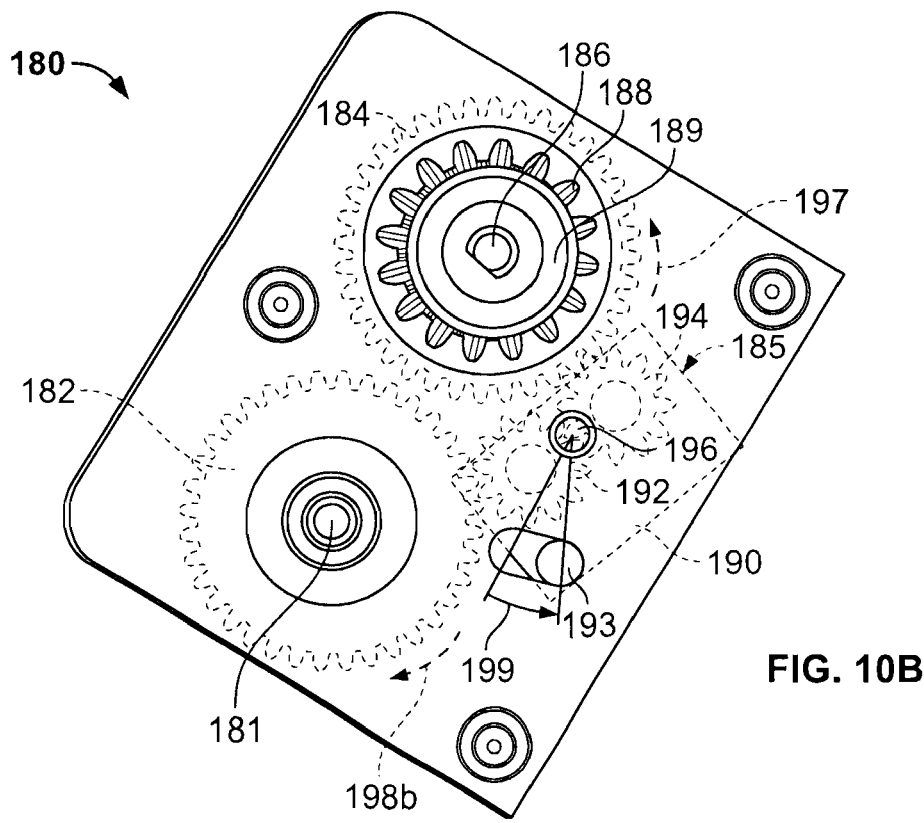
FIG. 10B is a top view of the gear system of FIG. 6 adjusted to a second position.

Referring now to FIGS. 10A-B, the self-adjusting gear system 180 is configured to automatically shift position in response to the input shaft 181 rotating in one of a first direction and a second, opposite direction. In such circumstances, the instrument 150 in which the gear system 180 is incorporated can automatically adjust and readily provide a positive output regardless of the fluid flow direction through the flow meter (FIG. 2). For example, the instrument 150 can include the mechanical counter device 160 (FIG. 2) and the electronic counter device 170 (FIG. 2) that count an amount of fluid flow in positive increments when the output shaft 186 of the gear system 180 is rotated in a forward rotational direction 197. Thus, forward rotation of the output shaft 186 can drive the positive counting operations by the mechanical counter device 160 (FIG. 2) and the electronic counter device 170 (FIG. 2). In this embodiment, the idler gear assembly 185 is adjustable relative to the input gear 182 and the output gear 184 so as to cause the output gear 184 to rotate in the forward rotational direction 197 regardless of whether the input gear 182 rotates in a first direction 198a (FIG. 10A) or in a second, opposite direction 198b (FIG. 10B). As such, the output shaft 186 can rotate the bevel gear 188 (to drive the mechanical counter device 160 (FIGS. 4-5)) and the magnet 189 (to drive the electronic counter device 170 (FIG. 2)) in the forward rotational direction 197 both when the input shaft 181 is driven in the first direction 198a (FIG. 10A) and when the input shaft 181 is driven in the second direction 198b (FIG. 10B).

As shown in FIG. 10A, the input shaft 181 of the gear system 180 may be driven in the first rotational direction 198a by the drive shaft 135 of the instrument drive device 130 (as described in connection with FIG. 1A). In this embodiment, the input shaft 181 is directly coupled to the input gear 182, so the input gear 182 also rotates in the first rotational direction 198a. In response, the idler gear assembly 185 is urged toward to a first orientation so that the output gear rotates in the forward rotational direction 197. In particular, the movable body 190 of the idler gear assembly 185 is positioned so that the guide pin 193 is in a first condition within the guide slot 183. If the guide pin 193 was not previously in this condition within the guide slot 183, the movable body 190 will automatically pivot to this condition (e.g., pivot about pivot pin 196) when the input gear 182 begins to rotate in the first rotational direction 198*a*. The idler gear assembly 185 is urged to this first orientation in response to the rotation of the input gear in the first direction 198*a* because the teeth of the input gear 182 act upon the teeth of the first idler gear 192, thereby causing a torque about the pivot pin 196. Such a torque abut the pivot pin 196 can urge the guide pin 193 toward the condition depicted in FIG. 10A. When the idler gear assembly 185 is in this first orientation, the first idler gear 192 engages both the input gear 182 and the output gear 184 while the second idler gear 194 is separated from the input gear 182 and the output gear 184. Accordingly, the input gear 182 is driven in the first rotational direction 198*a*, and the first idler gear 192 translates this motion to the output gear 184 so that the output gear 184 (and the output shaft 186 coupled thereto) rotates in the forward rotational direction 197.

As shown in FIG. 10B, if the input shaft 181 is driven in the second rotational direction 198*b* by the drive shaft 135 of the instrument drive device 130 (as described in connection with FIG. 1B), the self-adjusting gear system 180 can automatically adjust to so that the output gear 184 (and the output shaft 186 coupled thereto) rotates in the forward rotational direction 197. As previously described, the input shaft 181 in this embodiment is directly coupled to the input gear 182, so the input gear 182 also rotates in the second rotational direction 198*b*. In response, the idler gear assembly 185 is urged toward a second orientation in which the movable body 190 is positioned so that the guide pin 193 is in a second condition within the guide slot 183. If the guide pin 193 was not previously in this condition depicted in FIG. 10B, the guide pin 193 may move a displacement distance 199 within the guide slot 183 (e.g., the movable body 190 pivots about the pivot pin 196) when the input gear 182 begins to rotate in the second rotational direction 198*b*. As previously described, the idler gear assembly 185 is urged to this second orientation in response to the rotation of the input gear 182 in the second direction 198*b* because the teeth of the input gear 182 act upon the teeth of the first idler gear 192, thereby causing a torque about the pivot pin 196. Such a torque abut the pivot pin 196 can urge the guide pin 193 to move the displacement distance 199 toward the condition depicted in FIG. 10B. When the idler gear assembly 185 is in this second orientation, the first idler gear 192 directly engages the input gear 182 while the second idler gear 194 directly engages the output gear 184. In these circumstances, the input gear 182 is driven in the second rotational direction 198*b*, and the first idler gear 192 translates this motion to the second idler gear 194. The second idler gear 194 acts upon the output gear 184 so that the output gear 184 (and the output shaft 186 coupled thereto) rotates in the forward rotational direction 197.

Accordingly, the instrument 150 in which the gear system 180 resides can be self-adjusting so that the instrument 150 performs its output function independent of whether fluid passes through the flow meter 100 in a first flow direction (FIG. 1A) or in the second, opposite flow direction (FIG. 1B). In this embodiment, the corrector instrument 150 is mounted to the instrument drive device 130 and is capable of automatically adjusting to provide a positive output independent of whether the drive shaft 135 rotates in a first direction or a second, opposite direction (refer, for example, to FIGS. 1A-B). Because the corrector instrument 150 includes the self-adjusting gear system 180, the corrector instrument 150 is capable of performing its output function by counting upward in positive increments independent of the positive rotational direction of the drive shaft 135 on the instrument drive device 130.

Such a feature can be useful if the corrector instrument 150 is to be installed while the flow meter 100 is in the field of operation (e.g., already mounted into the flow system 10 as shown in FIG. 1A or FIG. 1B). In particular, the instrument 150 can be installed to the flow meter 100 without the need to partially disassemble the instrument 150 and manually adjust internal gears. For example, the field technician is not required to consider the positive direction of the fluid flow and thereafter manually adjust the instrument's internal gears in accordance with the positive rotational direction of the drive shaft 135. Rather, the field technician can readily mount the instrument 150 to the instrument drive 130, and the self-adjusting gear system 180 of the instrument will act accordingly to account for the positive direction of the fluid flow (and the positive rotational direction of the drive shaft 135).

It should be understood that the self-adjusting gear system may be used in instruments other than the corrector instrument. For example, the self-adjusting gear system 180 may be arranged in the index instrument 110, the instrument drive device 130, or in other accessory instruments that mount to the instrument drive device 130 (e.g., a chart recorder instrument or the like).

Referring to FIGS. 11A-B and 12-13, the self-adjusting gear system 180 may be arranged in an index instrument 210 so that a counter device 214 of the index instrument 210 counts in positive increments regardless of whether the positive fluid flow through the meter 100 is in the first direction (FIG. 11A) or the second direction (FIG. 11B). Similar to the index instrument 110 previously described in connection with FIG. 2, the index instrument 210 may be assembled to the flow meter 100 so that the counter device 214 (FIGS. 12-13) indicates the amount of fluid flow through the flow meter 100. The index instrument 210 may include a gear train that causes the counter device 214 to incrementally adjust in response to rotation of the impellers inside the flow meter 100. As described below, the self-adjusting gear system 180 may be incorporated into the gear train of the index instrument 210.

Figure 11A:
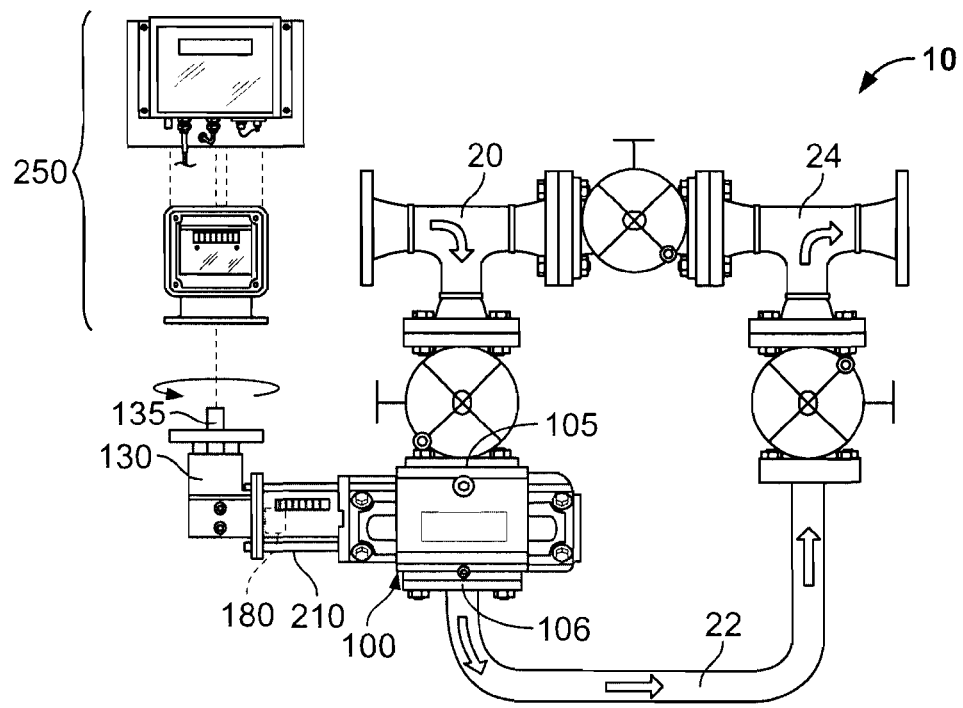
FIGS. 11A-B are views of a flow meter in a fluid flow system, in accordance with some embodiments.
Figure 11B:
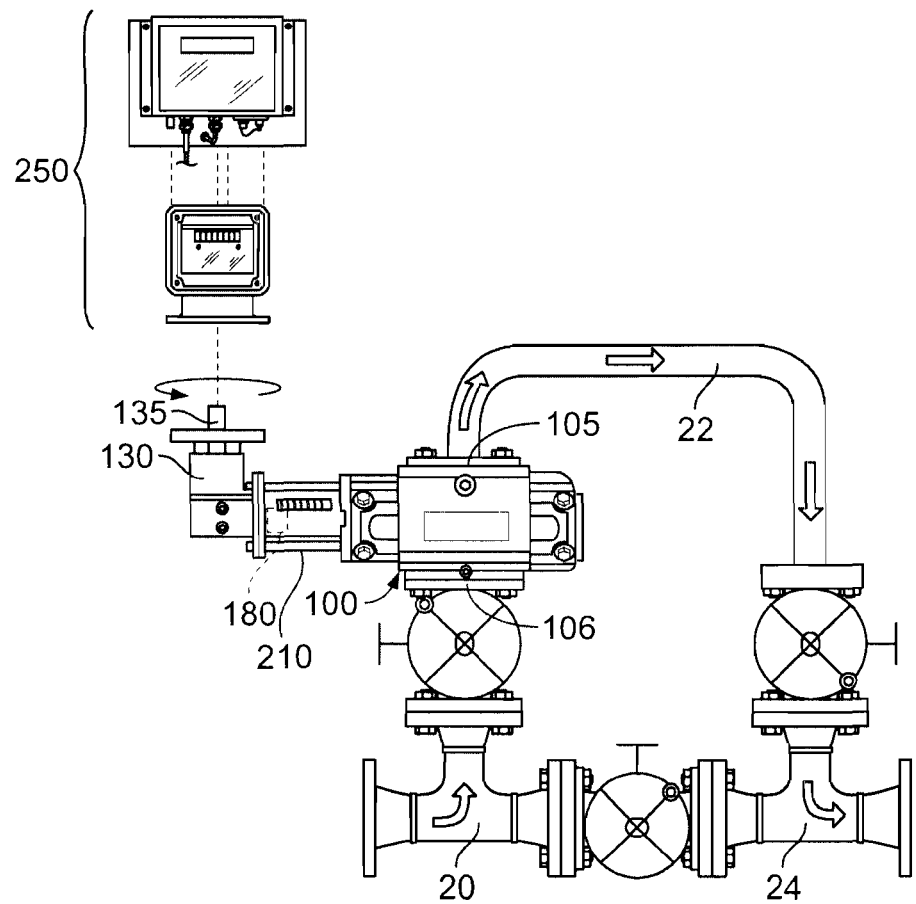

Referring to FIGS. 11A-B, the index instrument 210 is directly mounted to the flow meter 100 using a number of bolts. When the fluid flows into one of the ports 105 or 106 of the flow meter, the impellers rotate and cause a connector shaft 215 (FIGS. 12-13) to rotate, which drives the counter device 214 to operate (e.g., via the gear train). For example, the counter device 214 may be a mechanical counter device including an indicator (e.g., having an appearance similar to a vehicle odometer) that displays information related to the fluid flow through the flow meter 100, such as a volume of fluid passing through the flow meter 100. Similar to the embodiments previously described in connection with FIG. 2, the index instrument 210 may include a window panel 212 so that a user located at the flow meter 100 can view the information provided by the index instrument 210.

The self-adjusting gear system 180 may be incorporated into the index instrument 210 so that the index instrument 210 can self-adjust to perform its output function independent of whether fluid passes through the flow meter 100 in a first flow direction (FIG. 11A) or in the second opposite flow direction (FIG. 11B). As previously described in connection with FIGS. 10A-B, the self-adjusting gear system 180 can automatically shift positions to provide a positive output independent of whether the connector shaft 215 (e.g., coupled to the flow meter impellers) rotates in a first direction (FIG. 11A) or a second, opposite direction (FIG. 11B). Because the index instrument 210 includes the self-adjusting gear system 180, the index instrument 210 is capable of performing its output function by counting upward in positive increments regardless of the positive rotational direction of the connector shaft 215 (FIGS. 12-13)).

Still referring to FIGS. 11A-B, the instrument drive device 130 is coupled to the flow meter 100 via the index instrument 210. As such, the rotation of the drive shaft 135 of the instrument drive device 130 is directed by the output rotation from the index instrument 210. Because the index instrument 210 includes the self-adjusting gear system 180, the output rotation of the index instrument 210 is in one rotational direction independent of whether fluid passes through the flow meter 100 in a first flow direction (FIG. 11A) or in the second opposite flow direction (FIG. 11B). Accordingly, the drive shaft 135 rotates in one direction independent of whether the positive fluid flow through the meter is in the first direction (FIG. 11A) or the second direction (FIG. 11B). Thus, if an accessory instrument 250 is to be installed while the flow meter 100 is in the field of operation (e.g., already mounted into the flow system 10), the instrument 250 can be installed to the instrument drive device 130 without the need to partially disassemble the instrument 250 and manually adjust internal gears. For example, the field technician is not required to consider the positive direction of the fluid flow and thereafter manually adjust the instrument's internal gears in accordance with the positive rotational direction of the drive shaft 135. Rather, as previously described, the field technician can readily mount the instrument 250 to the instrument drive 130 because the drive shaft 135 rotates in one direction independent of whether the positive fluid flow through the meter is in the first direction (FIG. 11A) or the second direction (FIG. 11B). In such circumstances, the accessory instrument 250 can be designed according to the one rotational direction of the drive shaft 135.

Figure 12:
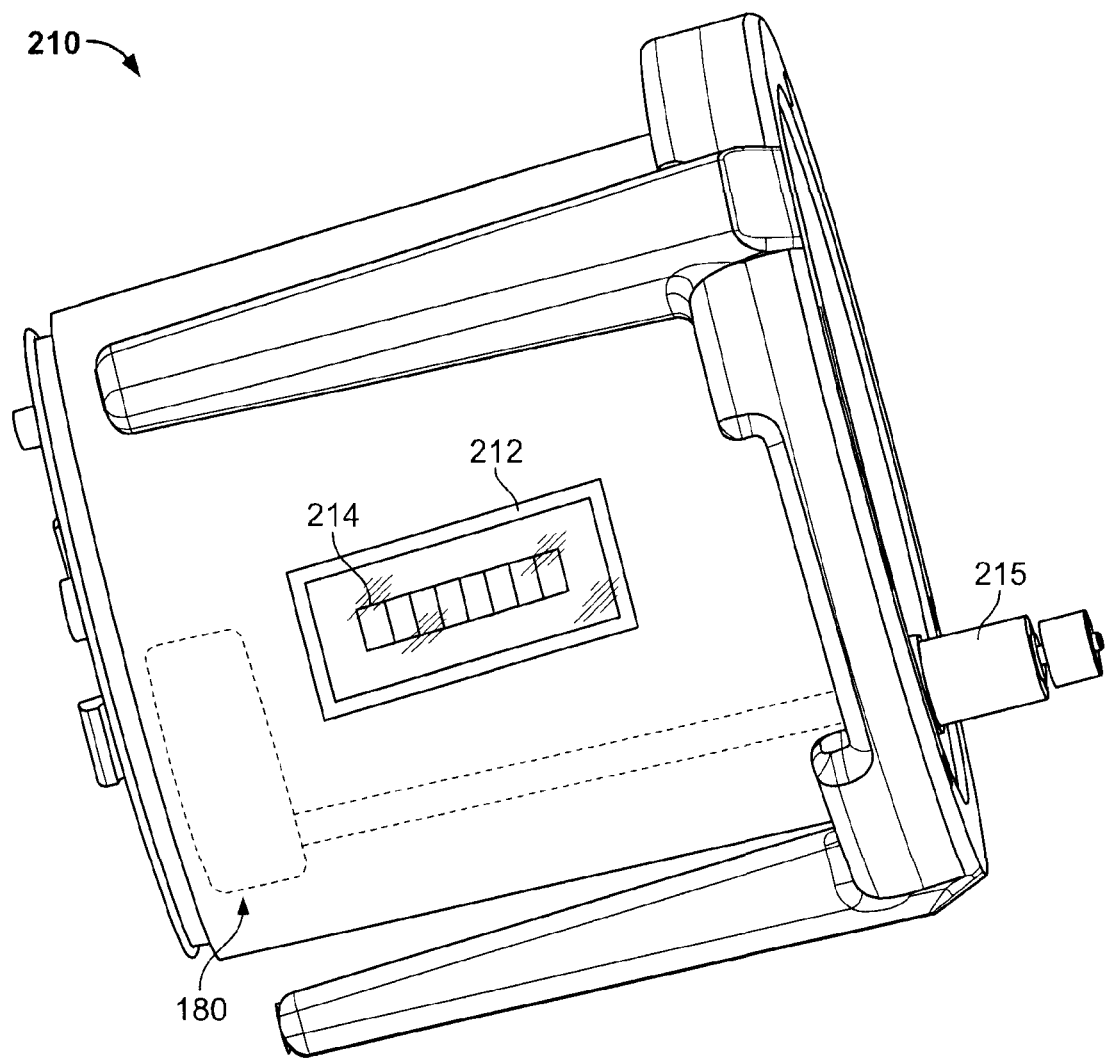
FIG. 12 is a perspective view of an index instrument shown in FIGS. 11A-B.
Figure 13:
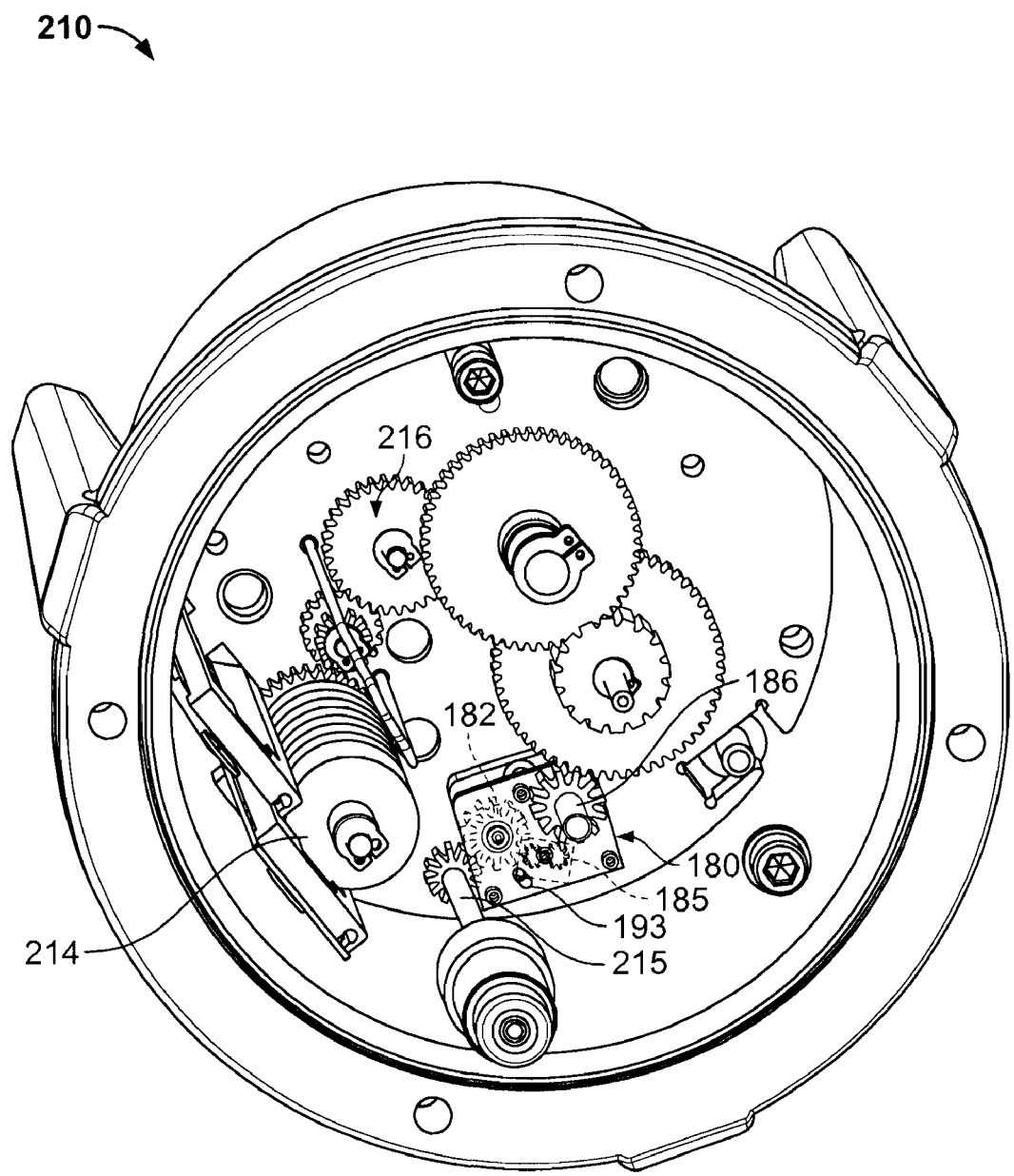
FIG. 13 is another perspective view of the index instrument of in FIG. 12.

Referring to FIGS. 12-13, the connector shaft 215 of the index instrument 210 is attachable to the flow meter 100 so that the connector shaft 215 rotates in response to the rotation of the flow meter impellers (not shown in FIGS. 12-13). The connector shaft 215 may engage the self-adjusting gear system 180 incorporated in the index instrument 210. In this embodiment, the connector shaft 215 serves as an input shaft to the gear system 180 by engaging the input gear 182 via an intermediate gear (refer to FIG. 13). In other embodiments, the connector shaft 215 may be directly coupled to the input gear 182 (e.g., acting as a direct input shaft for the gear system 180).

As shown in FIG. 13, the self-adjusting gear system 180 is configured to provide forward rotation to the output shaft 186, which drives the gear train 216 of the index instrument 210 in a positive direction to act upon the counter device 214. As such, the counter device 214 is capable of counting in positive increments in response to both rotation of the connector shaft 215 in a first direction and rotation of the connector shaft 215 in a second opposite direction. Similar to the operation previously described in connection with FIGS. 10A-B, the gear system 180 includes the input gear 182, the output gear 184 (not shown in FIG. 13; refer to FIGS. 10A-B), and the idler gear assembly 185 that pivots between a first orientation and a second orientation depending on the rotational direction of the input gear 182. For example, the guide pin 193 may be in one condition in the guide slot 183 when the idler gear assembly 185 is in the first orientation, and the guide pin 193 may be in a different condition within the guide slot 183 when the idler gear assembly 185 is in the second orientation. Such automatic adjustment by the idler gear assembly maintains the output rotation of the output shaft 186 in the forward rotational direction. Accordingly, the index instrument 210 can self-adjust to perform its output function independent of whether the connector shaft 215 is driven by the flow meter in a first direction or in a second opposite direction (e.g., independent of whether fluid passes through the flow meter 100 in a first flow direction (FIG. 11A) or in the second opposite flow direction (FIG. 11B).

Figure 14A:
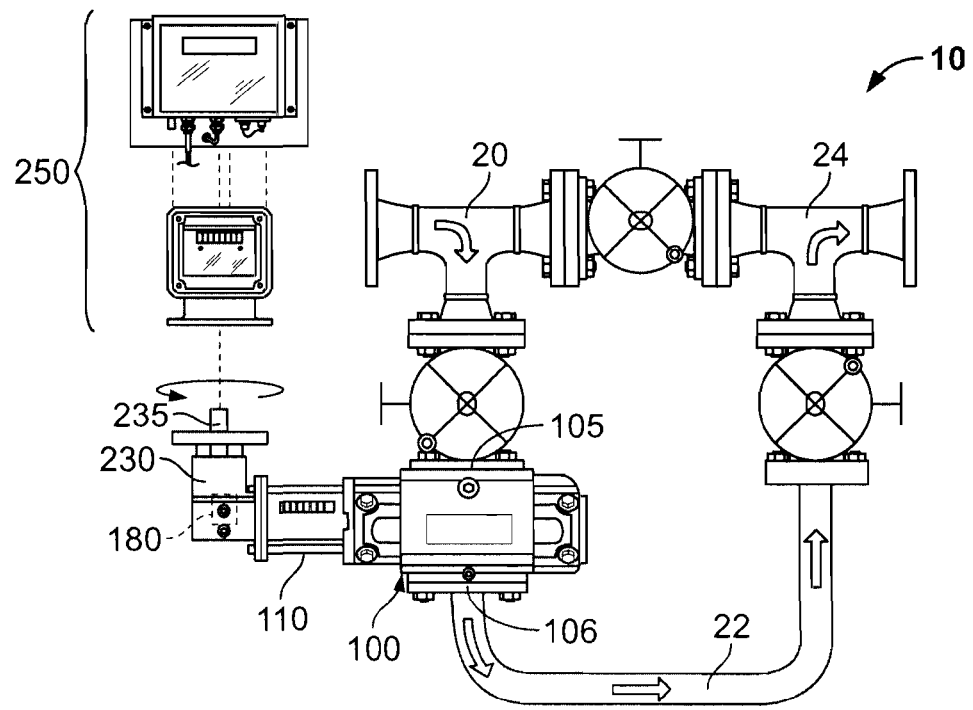
FIGS. 14A-B are views of a flow meter in a fluid flow system, in accordance with some embodiments.
Figure 14B:
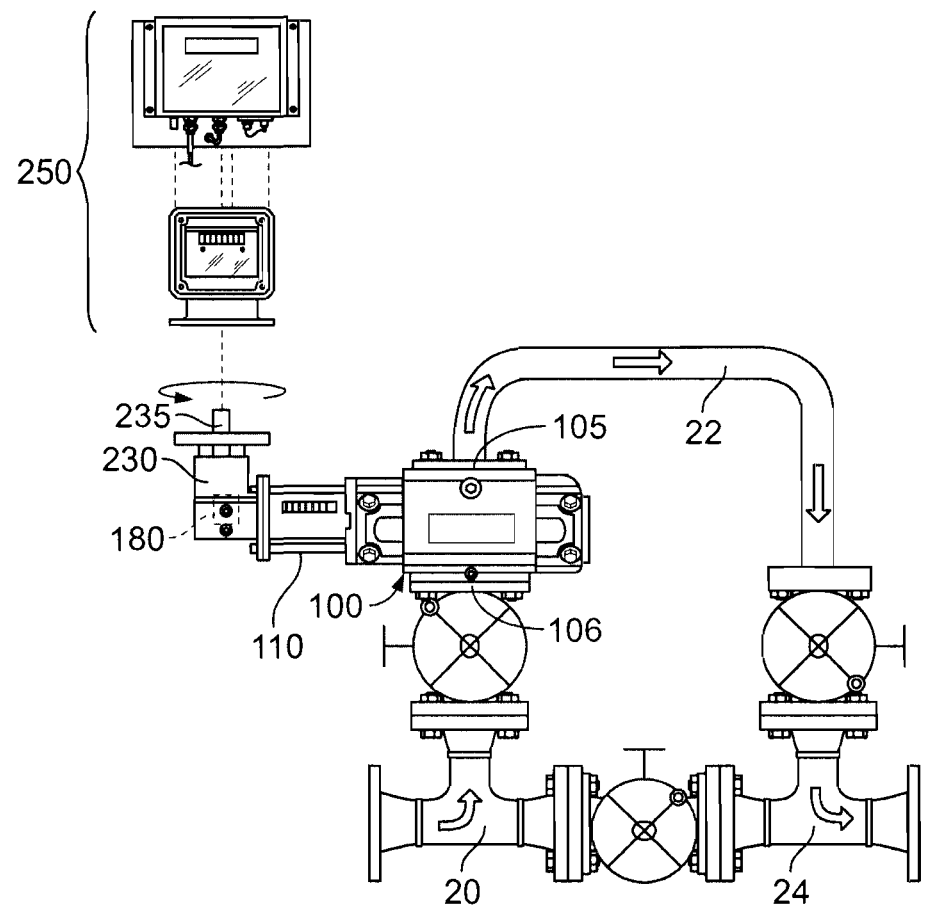

Referring now to FIGS. 14A-B, the self-adjusting gear system 180 may be incorporated into an instrument drive device 230 so that a drive shaft 235 rotates in one direction independent of whether the positive fluid flow through the meter is in the first direction (FIG. 14A) or the second direction (FIG. 14B). Similar to the instrument drive device 130 previously described in connection with FIG. 2, the instrument drive device 230 may be assembled to the flow meter 100 so that the drive shaft rotates in response to fluid flow through the flow meter 100. For example, the instrument drive device 230 and the index instrument 110 may include a number of shafts and gears that cause the drive shaft 235 to rotate in response to rotation of the impellers inside the flow meter 100. As described below, the self-adjusting gear system 180 may be incorporated into the gear train of the instrument drive device 230.

In this embodiment, the instrument drive device 230 is indirectly mounted to the flow meter 100 (e.g., via the index instrument 110). Because the instrument drive device 230 includes the self-adjusting gear system 180, the output rotation of the drive shaft 235 is in one direction independent of whether fluid passes through the flow meter 100 in a first flow direction (FIG. 14A) or in the second opposite flow direction (FIG. 14B). Similar to the operation previously described in connection with FIGS. 10A-B, the gear system 180 includes the idler gear assembly 185 that pivots between a first orientation and a second orientation depending on the rotational direction of the input gear 182. Such automatic adjustment by the idler gear assembly 185 maintains the output rotation of the gear system 180 in the forward rotational direction. Accordingly, the instrument drive device 230 can self-adjust to perform its output function independent of whether fluid passes through the flow meter 100 in a first flow direction (FIG. 14A) or in the second opposite flow direction (FIG. 14B).

Still referring to FIGS. 14A-B, when an accessory instrument 250 is to be installed while the flow meter 100 is in the field of operation (e.g., already mounted into the flow system 10), the instrument 250 can be installed to the instrument drive device 230 without the need to partially disassemble the instrument 250 and manually adjust internal gears. For example, the field technician is not required to consider the positive direction of the fluid flow and thereafter manually adjust the instrument's internal gears in accordance with the positive rotational direction of the drive shaft 235. Rather, as previously described, the field technician can readily mount the instrument 250 to the instrument drive device 230 because the drive shaft 235 rotates in one direction independent of whether the positive fluid flow through the meter is in the first direction (FIG. 14A) or the second direction (FIG. 14B). In these circumstances, the accessory instrument 250 can be designed according to the one rotational direction of the drive shaft 235.

A number of embodiments of the invention have been described. Nevertheless, it will be understood that various modifications may be made without departing from the spirit and scope of the invention. Accordingly, other embodiments are within the scope of the following claims.

What is claimed is:

1. An instrument for a flow meter, the instrument comprising:
- an input shaft that is driven to rotate in a first direction or in a second opposite direction by a flow meter when the input shaft is coupled to the flow meter;
- an output shaft that rotates in response to rotation of the input shaft, the rotation of the output shaft causing a data device to collect information related to the flow meter; and
- a gear system that couples the input shaft to the output shaft, said gear system to automatically adjust and thereby direct the output shaft in a forward rotational direction in response to both rotation of the input shaft in the first direction and rotation of the input shaft in the second opposite direction,
- wherein the gear system comprises an input gear coupled to the input shaft, an output gear coupled to the output shaft, and an idler gear assembly that translates rotational motion from the input gear to the output gear, the idler gear assembly including first and second idler gears collectively mounted to a movable body that, in response to rotation of the input gear in the first direction, shifts the arrangement of the first and second idler gears so that at least one of the first and second idler gears disengages the output gear, and
- wherein the movable body of the idler gear assembly is pivotable relative to the input gear from a first orientation in which the first idler gear directly engages both the input gear and the output gear to a second orientation in which the first idler gear directly engages only one of the input gear and the output gear.

2. The instrument of claim 1, wherein the idler gear assembly is a self-switching gear assembly that automatically shifts position in response to the input shaft rotating in one of the first direction and the second opposite direction.

3. The instrument of claim 1, wherein when the input shaft is coupled to the flow meter, the input shaft is driven to rotate in the first direction when fluid passes through the flow meter in a first flow direction and the input shaft is driven to rotate in the second opposite direction when fluid passes through the flow meter in a second opposite flow direction.

4. The instrument of claim 3, wherein the output shaft of the instrument device rotates only in the forward rotational direction both when fluid passes through the flow meter in the first flow direction and when fluid passes through the flow meter in the second opposite flow direction.

5. The instrument of claim 1, wherein the movable body of the idler gear assembly is pivotable relative to both the input gear and the output gear.

6. The instrument of claim 1, wherein in the instrument comprises an index instrument having a mechanical counter device that indicates an amount of fluid flow through the flow meter.

7. The instrument of claim 6, wherein the index instrument comprises:
- the data device that includes a mechanical counter device to provide information related to the fluid flow through a flow meter;
- the input shaft;
- the output shaft; and
- the gear system that is arranged to automatically adjust and thereby direct the output shaft in a forward rotational direction in response to both rotation of the input shaft in the first direction and rotation of the input shaft in the second opposite direction, the rotation of the output shaft causing a mechanical counter device to operate.

8. The instrument of claim 1, wherein the input shaft is driven to rotate by a flow meter comprising a rotary positive displacement meter.

9. The instrument of claim 1, wherein the said forward rotational direction of the output shaft is defined by a desired positive direction of an input to the data device.

10. The instrument of claim 1, wherein the data device includes an output to transmit a signal to a location remote from the flow meter, the signal indicating a volume of fluid passing through the flow meter, and the signal being transmitted by at least one of hard wire communication, fiber optic cable communication, and wireless communication.

11. An instrument for a flow meter, the instrument comprising:
- an input shaft that is driven to rotate in a first direction or in a second opposite direction by a flow meter when the input shaft is coupled to the flow meter;
- an output shaft that rotates in response to rotation of the input shaft, the rotation of the output shaft causing a data device to collect information related to the flow meter; and
- a gear system that couples the input shaft to the output shaft, said gear system to automatically adjust and thereby direct the output shaft in a forward rotational direction in response to both rotation of the input shaft in the first direction and rotation of the input shaft in the second opposite direction,
- wherein the gear system comprises an input gear coupled to the input shaft, an output gear coupled to the output shaft, and an idler gear assembly that translates rotational motion from the input gear to the output gear, the idler gear assembly including first and second idler gears collectively mounted to a movable body that, in response to rotation of the input gear in the first direction, shifts the arrangement of the first and second idler gears so that at least one of the first and second idler gears disengages the output gear, and
- wherein in the instrument comprises a corrector instrument that indicates a corrected amount of fluid flow through the flow meter, the corrected amount being at least one of temperature corrected and pressure corrected.

12. The instrument of claim 11, wherein the corrector instrument comprises:
- the input shaft;
- the output shaft that rotates in response to rotation of the input shaft, the rotation of the output shaft causing a magnet coupled to the output shaft to rotate;
- the data device that includes an electronic data device arranged proximate to the magnet to detect the rotation of the magnet and generate information related to an amount of fluid flow through the flow meter, the electronic data device generating a corrected value of fluid flow through the flow meter, the corrected value being at least one of a temperature-corrected value and a pressure-corrected value; and
- a mechanical counter device that is driven by the output shaft to indicate information related to an amount of fluid flow through the flow meter.

13. The instrument of claim 12, wherein the mechanical counter device indicates an uncorrected value of fluid flow through the flow meter while the electronic data device communicates at least the corrected value of fluid flow through the flow meter to a remote site, the electronic data device having a local user interface that includes an electronic display device.

14. The instrument of claim 12, wherein the gear system is accessible to a user only after removal of the mechanical counter device from the corrector instrument.

15. The instrument of claim 11, wherein the idler gear assembly is a self-switching gear assembly that automatically shifts position in response to the input shaft rotating in one of the first direction and the second opposite direction.

16. The instrument of claim 11, wherein when the input shaft is coupled to the flow meter, the input shaft is driven to rotate in the first direction when fluid passes through the flow meter in a first flow direction and the input shaft is driven to rotate in the second opposite direction when fluid passes through the flow meter in a second opposite flow direction.

17. The instrument of claim 16, wherein the output shaft of the instrument device rotates only in the forward rotational direction both when fluid passes through the flow meter in the first flow direction and when fluid passes through the flow meter in the second opposite flow direction.

18. The instrument of claim 11, wherein the movable body of the idler gear assembly is pivotable relative to the input gear from a first orientation in which a first idler gear directly engages both the input gear and the output gear to a second orientation in which the first idler gear directly engages only one of the input gear and the output gear.

19. The instrument of claim 18, wherein the movable body of the idler gear assembly is pivotable relative to both the input gear and the output gear.

20. The instrument of claim 11, wherein the input shaft is driven to rotate by a flow meter comprising a rotary positive displacement meter.

21. The instrument of claim 11, wherein the said forward rotational direction of the output shaft is defined by a desired positive direction of an input to the data device.

22. The instrument of claim 11, wherein the data device includes an output to transmit a signal to a location remote from the flow meter, the signal indicating a volume of fluid passing through the flow meter, and the signal being transmitted by at least one of hard wire communication, fiber optic cable communication, and wireless communication.

23. An instrument for a flow meter, the instrument comprising:
    an input shaft that is driven to rotate in a first direction or in a second opposite direction by a flow meter when the input shaft is coupled to the flow meter;
    an output shaft that rotates in response to rotation of the input shaft, the rotation of the output shaft causing a data device to collect information related to the flow meter; and
    a gear system that couples the input shaft to the output shaft, said gear system to automatically adjust and thereby direct the output shaft in a forward rotational direction in response to both rotation of the input shaft in the first direction and rotation of the input shaft in the second opposite direction,
    wherein the gear system comprises an input gear coupled to the input shaft, an output gear coupled to the output shaft, and an idler gear assembly that translates rotational motion from the input gear to the output gear, the idler gear assembly including first and second idler gears collectively mounted to a movable body that, in response to rotation of the input gear in the first direction, shifts the arrangement of the first and second idler gears so that at least one of the first and second idler gears disengages the output gear, and
    wherein in the instrument comprises an instrument drive device that mounts to the flow meter, the output shaft of the instrument drive device being a drive shaft that drives the operation of the data device.

24. The instrument of claim 23, wherein the instrument drive device comprises:
    a mounting platform to receive an accessory instrument for coupling with the flow meter;
    a drive shaft that extends from the mounting platform and rotates in response to rotation of the input shaft, the drive shaft arranged to drive the accessory instrument when the instrument attached to the mounting platform and is coupled to the drive shaft; and
    the gear system that is arranged to automatically adjust and thereby direct the drive shaft in a forward rotational direction in response to both rotation of the input shaft in the first direction and rotation of the input shaft in the second opposite direction.

25. The instrument of claim 23, wherein the idler gear assembly is a self-switching gear assembly that automatically shifts position in response to the input shaft rotating in one of the first direction and the second opposite direction.

26. The instrument of claim 23, wherein when the input shaft is coupled to the flow meter, the input shaft is driven to rotate in the first direction when fluid passes through the flow meter in a first flow direction and the input shaft is driven to rotate in the second opposite direction when fluid passes through the flow meter in a second opposite flow direction.

27. The instrument of claim 26, wherein the output shaft of the instrument device rotates only in the forward rotational direction both when fluid passes through the flow meter in the first flow direction and when fluid passes through the flow meter in the second opposite flow direction.

28. The instrument of claim 23, wherein the movable body of the idler gear assembly is pivotable relative to the input gear from a first orientation in which a first idler gear directly engages both the input gear and the output gear to a second orientation in which the first idler gear directly engages only one of the input gear and the output gear.

29. The instrument of claim 28, wherein the movable body of the idler gear assembly is pivotable relative to both the input gear and the output gear.

30. The instrument of claim 23, wherein the input shaft is driven to rotate by a flow meter comprising a rotary positive displacement meter.

31. The instrument of claim 23, wherein the said forward rotational direction of the output shaft is defined by a desired positive direction of an input to the data device.

32. The instrument of claim 23, wherein the data device includes an output to transmit a signal to a location remote from the flow meter, the signal indicating a volume of fluid passing through the flow meter, and the signal being transmitted by at least one of hard wire communication, fiber optic cable communication, and wireless communication.

33. A corrector instrument for a flow meter, the instrument comprising:
    an input shaft that is driven to rotate in a first direction or in a second opposite direction by an instrument drive device of a flow meter when the input shaft is coupled to the instrument drive device of the flow meter;
    an output shaft that rotates in response to rotation of the input shaft, the rotation of the output shaft causing a magnet coupled to the output shaft to rotate;

an electronic data device arranged proximate to the magnet to detect the rotation of the magnet and generate information related to an amount of fluid flow through the flow meter, the electronic data device generating a corrected value of fluid flow through the flow meter, the corrected value being at least one of a temperature-corrected value and a pressure-corrected value;

a mechanical counter device that is driven by the output shaft to indicate information related to an amount of fluid flow through the flow meter, wherein the mechanical counter device indicates an uncorrected value of fluid flow through the flow meter while the electronic data device communicates at least the corrected value of fluid flow through the flow meter to a remote site, the electronic data device having a local user interface that includes an electronic display device; and a gear system that couples the input shaft to the output shaft, said gear system to automatically adjust and thereby direct the output shaft in a forward rotational direction in response to both rotation of the input shaft in the first direction and rotation of the input shaft in the second opposite direction.

34. The corrector instrument of claim 33, wherein the gear system comprises a self-switching gear assembly that automatically shifts position in response to the input shaft rotating in one of the first direction and the second opposite direction.

35. The corrector instrument of claim 33, wherein the gear system comprises an input gear coupled to the input shaft and an output gear coupled to the output shaft, and an idler gear assembly that translates rotational motion from the input gear to the output gear, the idler gear assembly being pivotable relative to the input gear.

36. The corrector instrument of claim 33, wherein the gear system is accessible to a user only after removal of the mechanical counter device from the corrector instrument.

* * * * *